(12) United States Patent
Ghosh

(10) Patent No.: US 7,850,523 B2
(45) Date of Patent: Dec. 14, 2010

(54) SYSTEMS AND METHODS FOR PROVIDING A PLAYER'S TICKET

(76) Inventor: Sharad A. Ghosh, 6A Cameron Tower, Essena East Forbes Condominium, Fort Vonifacio, Taguig (PH)

( * ) Notice: Subject to any disclaimer, the term of this patent is extended or adjusted under 35 U.S.C. 154(b) by 0 days.

(21) Appl. No.: 12/644,773

(22) Filed: Dec. 22, 2009

(65) Prior Publication Data

US 2010/0099488 A1   Apr. 22, 2010

Related U.S. Application Data

(63) Continuation of application No. 11/101,950, filed on Apr. 8, 2005, now Pat. No. 7,637,809.

(51) Int. Cl.
*G06F 19/00* (2006.01)
*A63B 71/06* (2006.01)

(52) U.S. Cl. .............. 463/25; 463/26; 463/42; 273/138.1; 700/91; 700/93; 705/14.22; 705/14.38

(58) Field of Classification Search ............ 463/16–22, 463/24–29, 33, 42–43, 47; 273/138.1, 138.2, 273/141 A, 269, 454–456, 460; 283/49, 283/903; 700/91–93; 705/14.1, 14.12, 14.22, 705/14.3, 14.38; G06F 19/00; A63B 71/06
See application file for complete search history.

(56) References Cited

U.S. PATENT DOCUMENTS

| | | | |
|---|---|---|---|
| 4,962,950 A | 10/1990 | Champion | |
| 5,157,602 A | 10/1992 | Fields et al. | |
| 5,417,424 A | 5/1995 | Snowden et al. | |
| 5,419,592 A | 5/1995 | Stuart | |
| 5,518,239 A | 5/1996 | Johnston | |
| 5,569,082 A | 10/1996 | Kaye | |
| 5,575,474 A | 11/1996 | Rossides | |
| 5,683,090 A | 11/1997 | Zeile et al. | |
| 5,794,207 A | 8/1998 | Walker et al. | |
| 5,816,918 A | 10/1998 | Kelly et al. | |
| 5,846,132 A | 12/1998 | Junkin | |
| 5,934,671 A | 8/1999 | Harrison | |
| 6,007,426 A * | 12/1999 | Kelly et al. | ............... 463/16 |
| 6,024,643 A | 2/2000 | Begis | |
| 6,107,932 A * | 8/2000 | Walker et al. | ........... 340/5.22 |
| 6,173,209 B1 * | 1/2001 | Laval et al. | ............... 700/91 |

(Continued)

OTHER PUBLICATIONS

Hogg, Robert V. et al., "Applied Statistics for Engineers and Physical Scientists" (Edition 2), pp. 119-124, 447. Macmillan Publishing Company, New York, NY. 1992.

(Continued)

*Primary Examiner*—David L. Lewis
*Assistant Examiner*—Arthur O. Hall
(74) *Attorney, Agent, or Firm*—Ropes & Gray LLP

(57) ABSTRACT

Ticketing systems and methods are provided specifically relating to a player's ticket. A player's ticket references at least one player and allows the player's ticket holder to attend all sporting events played in by the at least one player referenced on the player's ticket. Information about a tournament, including the players, the tournament draw, and historical data, is acquired and used to determine the probabilities of players winning matches in the tournament. Event admissions for the player's ticket may be allocated by determining a probability distribution for accommodating all player's ticket holders and determining a profitability of the players ticket.

14 Claims, 15 Drawing Sheets

U.S. PATENT DOCUMENTS

| | | | |
|---|---|---|---|
| 6,216,227 B1 | 4/2001 | Goldstein et al. | |
| 6,240,415 B1 | 5/2001 | Blumberg | |
| 6,296,250 B1 | 10/2001 | Langan | |
| 6,309,307 B1 | 10/2001 | Krause et al. | |
| 6,371,855 B1 | 4/2002 | Gavriloff | |
| 6,473,084 B1 | 10/2002 | Phillips et al. | |
| 6,496,809 B1 * | 12/2002 | Nakfoor | 705/80 |
| 6,527,270 B2 | 3/2003 | Maksymec et al. | |
| 6,599,186 B1 * | 7/2003 | Walker et al. | 463/17 |
| 6,656,042 B2 | 12/2003 | Reiss et al. | |
| 6,665,648 B2 | 12/2003 | Brodersen et al. | |
| 6,665,649 B1 | 12/2003 | Megiddo | |
| 6,758,754 B1 | 7/2004 | Lavanchy et al. | |
| 6,798,599 B2 | 9/2004 | Dykes et al. | |
| 6,811,484 B2 | 11/2004 | Katz et al. | |
| 6,841,126 B2 | 1/2005 | Arthur et al. | |
| 6,997,380 B2 | 2/2006 | Safaei et al. | |
| 6,999,936 B2 * | 2/2006 | Sehr | 705/5 |
| 7,031,945 B1 * | 4/2006 | Donner | 705/64 |
| 7,047,169 B2 | 5/2006 | Pelikan et al. | |
| 7,050,868 B1 | 5/2006 | Graepel et al. | |
| 7,172,508 B2 * | 2/2007 | Simon et al. | 463/42 |
| 7,179,168 B1 * | 2/2007 | Tulley et al. | 463/25 |
| 7,206,755 B1 | 4/2007 | Muralidhar | |
| 7,249,062 B2 | 7/2007 | Norins, Jr. et al. | |
| 7,280,975 B1 | 10/2007 | Donner | |
| 7,363,267 B1 | 4/2008 | Vincent et al. | |
| 7,416,485 B2 | 8/2008 | Walker et al. | |
| 7,555,361 B2 * | 6/2009 | Nakamura et al. | 700/237 |
| 7,637,809 B2 | 12/2009 | Ghosh | |
| 7,762,881 B2 | 7/2010 | Ghosh | |
| 2001/0018660 A1 | 8/2001 | Sehr | |
| 2002/0052758 A1 | 5/2002 | Arthur et al. | |
| 2002/0116343 A1 | 8/2002 | Nakamura et al. | |
| 2002/0128922 A1 * | 9/2002 | Joao | 705/26 |
| 2003/0055614 A1 | 3/2003 | Pelikan et al. | |
| 2003/0060257 A1 | 3/2003 | Katz et al. | |
| 2003/0199312 A1 | 10/2003 | Walker et al. | |
| 2004/0006497 A1 * | 1/2004 | Nestor et al. | 705/5 |
| 2004/0133470 A1 | 7/2004 | Safaei et al. | |
| 2005/0015303 A1 | 1/2005 | Dubin et al. | |
| 2005/0043094 A1 | 2/2005 | Nguyen et al. | |
| 2005/0071245 A1 | 3/2005 | Norins, Jr. et al. | |
| 2005/0096117 A1 | 5/2005 | Katz et al. | |
| 2005/0148380 A1 | 7/2005 | Cannon et al. | |
| 2006/0229749 A1 | 10/2006 | Ghosh | |
| 2007/0173308 A1 | 7/2007 | Ghosh | |
| 2008/0004930 A1 | 1/2008 | Ghosh | |

OTHER PUBLICATIONS

Landsburg, Steven E., "Price Theory and Applications" (Third Edition), pp. 1-5, 12-19, 117-137, 343-346, 361-371. West Publishing Company, St. Paul, MN. 1995.

W. David Kelton, et al., "Simulation with Arena" (Third Edition), pp. 599-605, 626, 630-631. McGraw-Hill Companies, Inc., New York, NY. 2004.

TicketRESERVE.com, "Help," available through http://www.ticketreserve.com/faq_main.html?ugid=, undated but accessed on Aug. 23, 2006.

TicketRESERVE.com, "Never miss a playoff or championship game again!," available through http://www.ticketreserve.com/home.html, undated but accessed on Aug. 23, 2006.

TicketRESERVE.com, "Never miss a playoff or championship game again!," available through http://www.ticketreserve.com/fanForward.html?ugid=, undated but accessed on Aug. 23, 2006.

TicketRESERVE.com, "About Us," available through http://www.ticketreserve.com/aboutUs.html?ugid=, undated but accessed on Aug. 23, 2006.

"yOOnew Store," available through http://www.yoonew.com/store, copyright 2005, accessed Aug. 23, 2006.

"Ticket Overview," FIFA World Cup website, available through http://fifaworldcup.yahoo.com/06/en/tickets/overview.html, copyright 2001-2006, accessed on Aug. 23, 2006.

OC 2006 FIFA World Cup, "FIFA World Cup ticket sales resume May 2," FIFA World Cupwebsite, available through http://fifaworldcup.yahoo.com/06/en/050429/1/3k83.html, published on Apr. 29, 2005, accessed on Aug. 23, 2006.

* cited by examiner

| Round # | Match # | Player A | | Player B | Chances of Player A Winning | Chances of Player B Winning |
|---|---|---|---|---|---|---|
| 1 | 1 | Player 1 | vs. | Player 15 | 0.95 | 0.05 |
| | 2 | Player 12 | vs. | Player 5 | 1-[Normal dist.(mean 0.75, std. dev. 0.08)] | Normal dist.(mean 0.75, std. dev. 0.08) |
| | 3 | Player 4 | vs. | Player 16 | 0.80 | 0.20 |
| | 4 | Player 9 | vs. | Player 8 | 0.40 | 0.60 |
| | 5 | Player 6 | vs. | Player 10 | 0.70 | 0.30 |
| | 6 | Player 13 | vs. | Player 3 | 0.15 | 0.85 |
| | 7 | Player 7 | vs. | Player 11 | 0.65 | 0.35 |
| | 8 | Player 14 | vs. | Player 2 | 1-[Normal dist.(mean 0.9, std. dev. 0.03)] | Normal dist.(mean 0.9, std. dev. 0.03) |
| 2 | 9 | Winner of match 1 | vs. | Winner of match 2 | 0.80 | 0.20 |
| | 10 | Winner of match 3 | vs. | Winner of match 4 | 0.65 | 0.35 |
| | 11 | Winner of match 5 | vs. | Winner of match 6 | 0.30 | 0.70 |
| | 12 | Winner of match 7 | vs. | Winner of match 8 | Normal dist.(mean 0.15, std. dev. 0.04) | 1-[Normal dist.(mean 0.15, std. dev. 0.04)] |
| 3 | 13 | Winner of match 9 | vs. | Winner of match 10 | 0.60 | 0.40 |
| | 14 | Winner of match 11 | vs. | Winner of match 12 | Normal dist.(mean 0.55, std. dev. 0.1) | 1-[Normal dist.(mean 0.55, std. dev. 0.1)] |
| 4 | 15 | Winner of match 13 | vs. | Winner of match 14 | Normal dist.(mean 0.52, std. dev. 0.05) | 1-[Normal dist.(mean 0.52, std. dev. 0.05)] |

| Players | # of Players' Tickets Allocated in Round 1 | # of Players' Tickets Allocated in Round 2 | # of Players' Tickets Allocated in Round 3 | # of Players' Tickets Allocated in Round 4 |
|---|---|---|---|---|
| 1 | 100 | 100 | 100 | 100 |
| 2 | 90 | 90 | 90 | 90 |
| 3 | 80 | 80 | 80 | 80 |
| 4 | 70 | 70 | 70 | 70 |
| 5 | 100 | 100 | 100 | 100 |
| 6 | 30 | 30 | 30 | 30 |
| 7 | 60 | 60 | 60 | 60 |
| 8 | 60 | 60 | 60 | 60 |
| 9 | 55 | 55 | 55 | 55 |
| 10 | 90 | 90 | 90 | 90 |
| 11 | 55 | 55 | 55 | 55 |
| 12 | 20 | 20 | 20 | 20 |
| 13 | 10 | 10 | 10 | 10 |
| 14 | 5 | 5 | 5 | 5 |
| 15 | 5 | 5 | 5 | 5 |
| 16 | 0 | 0 | 0 | 0 |
| 1 for Round 3 onwards | 0 | 0 | 50 | 50 |
| 3 for Round 2 onwards | 0 | 75 | 75 | 75 |
| 4 for Round 3 onwards | 0 | 0 | 40 | 40 |
| 1,2 | 60 | 60 | 60 | 60 |
| 1,2,3 | 30 | 30 | 30 | 30 |
| 4,5,8 for Round 2 onwards | 0 | 15 | 15 | 15 |
| 10,11 | 10 | 10 | 10 | 10 |

ROUND 1

| Match # | Player # | Probability of Player Winning Round 1 | # of Players' Tickets for Each Player | Total Players' Tickets | Score | Winner |
|---|---|---|---|---|---|---|
| 1 | 1<br>15 | 0.95<br>0.05 | 190<br>5 | 195 | 0.827<br>0.028 | 1 |
| 2 | 12<br>5 | 0.18<br>0.82 | 20<br>100 | 120 | 0.060<br>0.452 | 5 |
| 3 | 4<br>16 | 0.80<br>0.20 | 70<br>0 | 70 | 0.779<br>0.005 | 4 |
| 4 | 9<br>8 | 0.40<br>0.60 | 55<br>60 | 115 | 0.106<br>0.516 | 8 |
| 5 | 6<br>10 | 0.70<br>0.30 | 30<br>100 | 130 | 0.125<br>0.244 | 10 |
| 6 | 13<br>3 | 0.15<br>0.85 | 10<br>110 | 120 | 0.146<br>0.449 | 3 |
| 7 | 7<br>11 | 0.65<br>0.35 | 60<br>65 | 125 | 0.331<br>0.305 | 7 |
| 8 | 14<br>2 | 0.08<br>0.92 | 5<br>180 | 185 | 0.016<br>0.456 | 2 |

FIG. 4

ROUND 2

| Match # | Player # | Probability of Player Winning Round 2 | # of Players' Tickets for Each Player | Total Players' Tickets | Score | Winner |
|---|---|---|---|---|---|---|
| 9 | 1 | 0.80 | 190 | 305 | 0.570 | 1 |
|   | 5 | 0.20 | 115 |     | 0.134 |   |
| 10 | 4 | 0.65 | 77.5 | 145 | 0.576 | 4 |
|    | 8 | 0.35 | 67.5 |     | 0.004 |   |
| 11 | 10 | 0.30 | 100 | 285 | 0.124 | 3 |
|    | 3  | 0.70 | 185 |     | 0.590 |   |
| 12 | 7 | 0.16 | 60 | 240 | 0.050 | 2 |
|    | 2 | 0.84 | 180 |    | 0.292 |   |

ROUND 3

| Match # | Player # | Probability of Player Winning Round 3 | # of Players' Tickets for Each Player | Total Players' Tickets | Score | Winner |
|---|---|---|---|---|---|---|
| 13 | 1 | 0.60 | 240 | 265 | 0.179 | 1 |
|    | 4 | 0.40 | 125 |     | 0.078 |   |
| 14 | 3 | 0.46 | 170 | 335 | 0.181 | 2 |
|    | 2 | 0.54 | 165 |     | 0.500 |   |

ROUND 4

| Match # | Player # | Probability of Player Winning Round 4 | # of Players' Tickets for Each Player | Total Players' Tickets | Score | Winner |
|---|---|---|---|---|---|---|
| 15 | 1 | 0.53 | 195 | 330 | 0.142 | 2 |
|    | 2 | 0.47 | 135 |     | 0.156 |   |

FIG. 5

| ROUND 1 | |
|---|---|
| Match # | # of Player's Tickets for Match |
| 1 | 195 |
| 2 | 120 |
| 3 | 70 |
| 4 | 115 |
| 5 | 130 |
| 6 | 120 |
| 7 | 125 |
| 8 | 185 |

| ROUND 2 | | | |
|---|---|---|---|
| Match # | Different Options of Number of Seats Required ('n') for Players' Ticket Holders for Each Match | # of Iterations Option Occurs | % of Times 'n' Tickets Will Accommodate All Ticket Holders |
| 9 | 25 | 11 | 0.4% |
|  | 120 | 63 | 2.5% |
|  | 210 | 490 | 18.8% |
|  | 305 | 2436 | 100.0% |
| 10 | 55 | 131 | 4.4% |
|  | 75 | 243 | 12.5% |
|  | 140 | 845 | 40.6% |
|  | 145 | 1781 | 100.0% |
| 11 | 40 | 193 | 6.4% |
|  | 110 | 48 | 8.0% |
|  | 215 | 2165 | 80.2% |
|  | 285 | 594 | 100.0% |
| 12 | 65 | 116 | 3.9% |
|  | 70 | 48 | 5.5% |
|  | 240 | 2064 | 74.3% |
|  | 245 | 772 | 100.0% |

FIG. 6

| Match # | Different Options of Number of Seats Required ('n') for Players' Ticket Holders for Each Match | # of Iterations Option Occurs | % of Times 'n' Tickets Will Accommodate All Ticket Holders |
|---|---|---|---|
| colspan="4" | ROUND 3 |||
| 13 | 5 | 4 | 0.1% |
| | 20 | 4 | 0.3% |
| | 60 | 6 | 0.5% |
| | 75 | 2 | 0.5% |
| | 80 | 15 | 1.0% |
| | 95 | 18 | 1.6% |
| | 115 | 25 | 2.5% |
| | 130 | 43 | 3.9% |
| | 145 | 41 | 5.3% |
| | 170 | 20 | 5.9% |
| | 175 | 66 | 8.1% |
| | 225 | 212 | 15.2% |
| | 240 | 245 | 23.4% |
| | 295 | 226 | 30.9% |
| | 315 | 474 | 46.7% |
| | 365 | 1599 | 100.0% |
| 14 | 15 | 7 | 0.2% |
| | 35 | 22 | 1.0% |
| | 70 | 20 | 1.6% |
| | 75 | 4 | 1.8% |
| | 90 | 24 | 2.6% |
| | 95 | 13 | 3.0% |
| | 105 | 8 | 3.3% |
| | 155 | 3 | 3.4% |
| | 160 | 8 | 3.6% |
| | 190 | 265 | 12.5% |
| | 210 | 444 | 27.3% |
| | 245 | 139 | 31.9% |
| | 250 | 58 | 33.8% |
| | 280 | 123 | 37.9% |
| | 335 | 1862 | 100.0% |

FIG. 7

| Match # | Different Options of Number of Seats Required ('n') for Players' Ticket Holders for Each Match | # of Iterations Option Occurs | % of Times 'n' Tickets Will Accommodate All Ticket Holders |
|---|---|---|---|
| ROUND 4 ||||
| 15 | 5 | 1 | 0.0% |
|  | 10 | 3 | 0.1% |
|  | 15 | 1 | 0.2% |
|  | 30 | 8 | 0.4% |
|  | 35 | 2 | 0.5% |
|  | 50 | 4 | 0.6% |
|  | 60 | 5 | 0.8% |
|  | 65 | 5 | 1.0% |
|  | 70 | 1 | 1.0% |
|  | 80 | 3 | 1.1% |
|  | 85 | 19 | 1.7% |
|  | 100 | 3 | 1.8% |
|  | 105 | 25 | 2.7% |
|  | 115 | 5 | 2.8% |
|  | 120 | 4 | 3.0% |
|  | 125 | 7 | 3.2% |
|  | 130 | 20 | 3.9% |
|  | 135 | 39 | 5.2% |
|  | 140 | 2 | 5.2% |
|  | 145 | 27 | 6.1% |
|  | 155 | 60 | 8.1% |
|  | 175 | 11 | 8.5% |
|  | 180 | 32 | 9.6% |
|  | 185 | 71 | 11.9% |
|  | 190 | 25 | 12.8% |
|  | 200 | 18 | 13.4% |
|  | 205 | 20 | 14.0% |
|  | 215 | 3 | 14.1% |
|  | 225 | 22 | 14.9% |
|  | 235 | 29 | 15.8% |
|  | 240 | 41 | 17.2% |
|  | 245 | 43 | 18.6% |
|  | 250 | 43 | 20.1% |
|  | 255 | 66 | 22.3% |
|  | 260 | 75 | 24.8% |
|  | 270 | 147 | 29.7% |
|  | 295 | 75 | 32.2% |
|  | 300 | 140 | 36.8% |
|  | 305 | 270 | 45.8% |
|  | 310 | 268 | 54.8% |
|  | 330 | 609 | 75.1% |
|  | 340 | 45 | 76.6% |
|  | 395 | 703 | 100.0% |

| ROUND 2 | | | |
|---|---|---|---|
| Match # | Different Options of Number of Seats Required ('n') for Players' Ticket Holders for Each Match | # of Iterations Option Occurs | % of Times 'n' Tickets Will Accommodate All Ticketholders |
| 12 | 49 | 116 | 3.9% |
| | 53 | 48 | 5.5% |
| | 180 | 2064 | 74.3% |
| | 184 | 772 | 100.0% |

SYSTEMS AND METHODS FOR PROVIDING A PLAYER'S TICKET

CROSS-REFERENCE TO RELATED APPLICATION

This application is a continuation of U.S. patent application Ser. No. 11/101,950, filed Apr. 8, 2005 which is hereby incorporated by reference herein in its entirety.

BACKGROUND OF THE INVENTION

The present invention relates to ticketing systems and methods and particularly to systems and methods for providing a player's ticket.

Currently, sports fans may only purchase tickets for specific games or matches of a sport. In exchange for the purchase, the sports fan (or ticket holder) receives an ordinary ticket (e.g., general admission ticket, reserved ticket, unreserved ticket, etc.) which entitles the ticket holder admission to a particular event (i.e., a game or match). Typically, the ticket specifies at least the day, time, and location of the game. The ticket may not specify the day, time, and location of the game if, for example, the ticket is for a playoff game in which the day, time, and location of the game may be dependent on the outcome of other games.

In a sport, such as tennis, a sports fan may only purchase tickets for a particular match or a group of matches occurring during a particular time period in a tournament. These tickets may be made available for purchase in advance of the tournament, at a time when the players in particular matches or a group of matches are unknown. For example, in order for a sports fan to purchase a ticket for the semi-final match for the U.S. Open tennis tournament, the sports fan may have to purchase the ticket before the tournament begins. Because the selection of players for this match, which occurs late in the tournament, is dependent upon which players win in the earlier matches of the tournament, the sports fan will not know at the time of purchase who will be playing in this later match. This approach to ticket sales results in sports fans buying tickets for matches between players in which the sports fan may have little interest. A sports fan may be faced with giving away or not using a ticket and forfeiting his investment, selling the ticket at a loss, or attending a match the sports fan does not desire attending.

Therefore, it would desirable to provide systems and methods that provide sports fans with an opportunity to purchase tickets for sporting events played by specific players or teams that interest the sports fan.

SUMMARY OF THE INVENTION

It is therefore an object of the present invention to provide systems and methods that provide sports fans with an opportunity to purchase tickets for sporting events played by specific players or teams that interest the sports fan.

One approach for alleviating the aforementioned difficulties is for the organizers of a tournament to sell to a sports fan tickets, for the tournament, that reference a player or players rather than a match or game. The sports fan (or ticket holder) may be able to attend any match being played by the players referenced on the ticket. This type of ticket may be known as a "player's ticket." The total number of matches that the player's ticket holder attends may be dependent upon the success of the player(s) referenced on the ticket.

Different types of player's tickets may be provided. One type of player's ticket may be an all-rounds player's ticket in which a ticket may reference one player and may provide entry to all matches played in by that player. A "round-'x'-onwards" player's ticket may reference one player and provide entry to all matches played in by the player for round "x" and each subsequent round, where x>1. Another type of player's ticket may be a "multiple-players'" ticket in which a ticket may reference multiple players and may provide entry to all matches played in by any of the players on the ticket. If a match is played between two or more players that are on the multiple-players' ticket, the ticket may entitle the multiple-players' ticket holder to only one seat.

The probabilities of each player winning the player's potential matches may be used to predict with certain levels of confidence how many seats may be allocated for player's ticket holders. In order to determine how many seats may be necessary to allocate for player's ticket holders, various techniques for simulating matches may be utilized. Alternatively, various formulas for estimating how many seats may be necessary to allocate for player's ticket holders may also be utilized. The simulations or formulas may be used to determine the various outcomes of each match of a tournament. From this, the different number of tickets necessary to accommodate all player's tickets for each match at various levels of confidence may be discovered. Once the different probability distributions are provided, the organizer of the tournament may determine how many seats to allocate for player's ticket holders for each relevant match.

The number of player's tickets of each type that should be sold and the price for these player's tickets may be dependent upon the profitability of each type of player's ticket and information obtained from the marginal cost curve, marginal revenue curve, and demand curve for each type of player's ticket. In general, the goal of the tournament organizing entity will be to maximize profits. For each type of player's ticket that is profitable to issue, this may be accomplished by issuing player's tickets (that are issued at a single price) up to the quantity at which the marginal cost of each player's ticket to the tournament organizing entity equals the marginal revenue from each player's ticket. The single price at which such player's tickets should desirably be issued is the point on the demand curve corresponding to the number of player's tickets that have been issued. Since the aim of the tournament organizing entity is to maximize profits, player's tickets that that are not profitable to issue may not be issued. In some cases, the tournament organizing entity may be able to increase profits by following a different pricing strategy from that outlined above and charging various prices for the same player's ticket. An important component of the marginal cost of issuing a player's ticket may be the forgone profits from the ordinary tickets that it replaces. The demand and marginal revenue curves for a player's ticket may be influenced by factors such as the popularity of the player that the ticket references, the number of matches that the ticket is potentially valid for, the expected number of matches that the player is expected to play in, and the consistency of the player.

Depending upon how many seats are allocated for player's ticket holders, the results of previous matches, the number of player's ticket holders that do not show for a particular match, and other possible factors, there may be a shortfall or an excess of seats for player's tickets for a particular match. Various mitigation techniques may be utilized to manage the shortfall or excess of seats. If there is an excess number of seats for player's tickets, the extra seats may be sold as ordinary tickets or repackaged as part of new player's tickets. If there is a shortfall in the number of seats for player's tickets, seats allocated for ordinary tickets that are unsold may be used for player's tickets. In addition, ordinary tickets may be bought back or player's tickets may not guarantee a ticket holder admission.

BRIEF DESCRIPTION OF THE DRAWINGS

The above and other objects and advantages of the invention will be apparent upon consideration of the following detailed description, taken in conjunction with accompanying drawings, in which like reference characters refer to like parts throughout, and in which:

FIG. 2 is a depiction of the sample tournament bracket of FIG. 1 in table format in accordance with certain embodiments of the present invention;

FIG. 3 is a table of player's ticket allocations for each round in the sample tournament in accordance with certain embodiments of the present invention;

FIGS. 4 and 5 are tables of a simulation of the sample tournament in accordance with certain embodiments of the present invention;

FIGS. 6, 7, and 8 are tables of how many player's tickets are required in the matches for the sample tournament in accordance with certain embodiments of the present invention;

FIG. 10 is a table illustrating a dampening technique of probability distributions of seat allocations in accordance with certain embodiments of the present invention;

Skilled artisans will appreciate that some elements in certain drawings are illustrated for simplicity and clarity and have not necessarily been drawn to scale.

DETAILED DESCRIPTION OF THE INVENTION

This invention relates to ticketing systems and methods and particularly to systems and methods for providing a player's ticket based on the probabilities of players winning their matches and the number of player's tickets sold for each player for each match.

The following embodiment of the invention relates to player's tickets for tennis. However, the invention is not limited to tennis. Rather, this embodiment is provided for illustration of the invention and not to limit it to a particular sport. This invention may also be used for other sports, such as baseball, football, basketball, hockey, soccer, track and field, swimming or any other sport. In the context of team sports, the player's ticket may be considered a "team's ticket." However, for simplicity, the ticket associated with this invention will be referred to herein as a "player's ticket."

An organization that arranges a tournament, a ranking organization, or any other entity, may rank the players participating in the tournament in order of skill or in any other desirable order. The organization that arranges the tournament may be divided into different groups to manage the different aspects of the tournament. If desired, however, the organization managing the tournament may be a single tournament organizing entity. For simplicity, this tournament organizing entity will be referred to herein as the "tournament director," regardless of whether it is a single tournament organizing entity or encompasses the various groups that manage the tournament. Decisions described herein that are made by the tournament director may be made by any of the various groups that manage the tournament.

Figure 1:
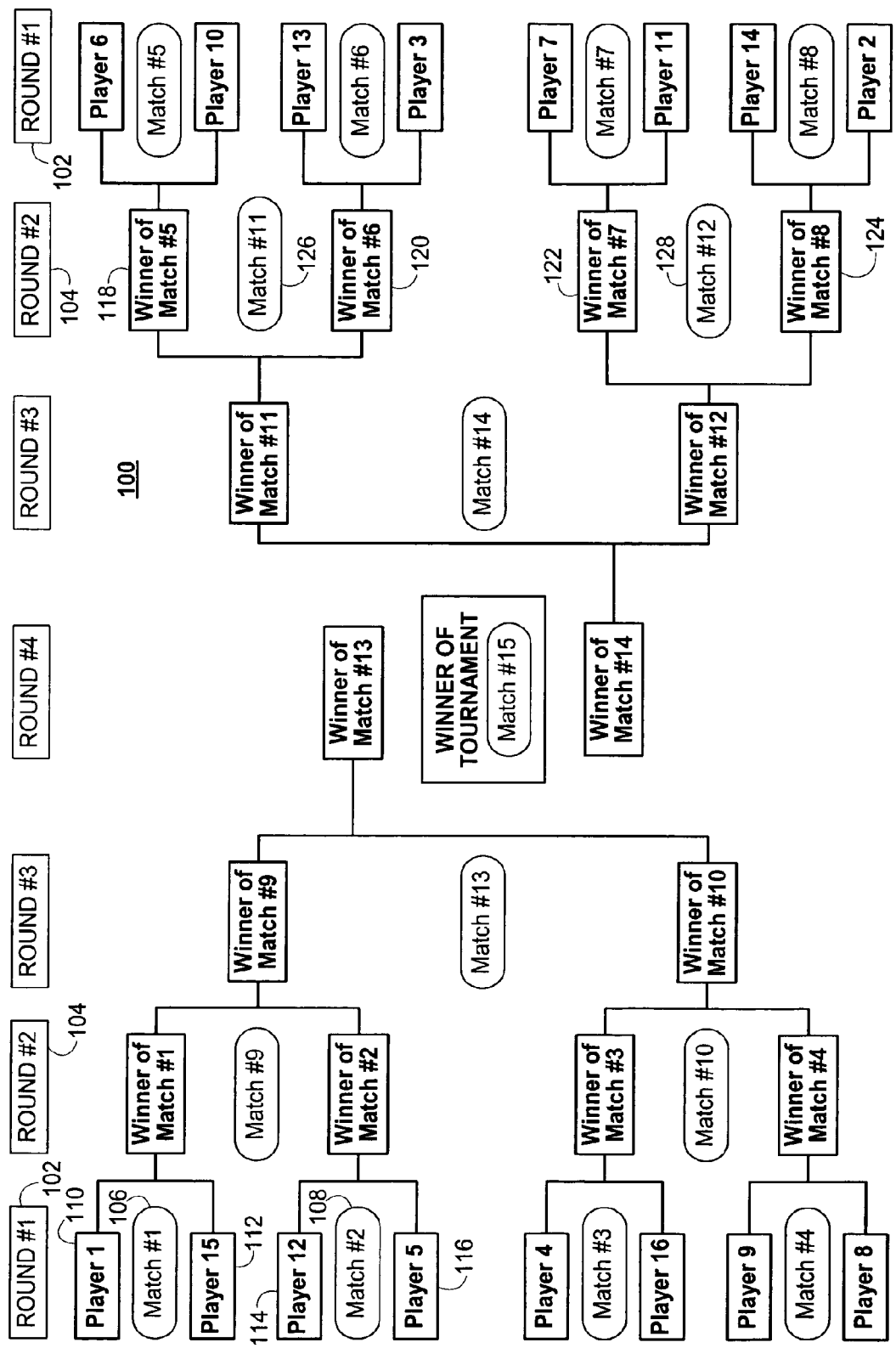
FIG. 1 is a tournament bracket of a sample sports tournament as used in conjunction with certain embodiments of the present invention.

Referring to FIG. 1, tournament bracket 100 is shown for a sample sports tournament. Many aspects of this invention will be described in the context of the sample tournament provided in FIG. 1. As illustrated in bracket 100 there are sixteen players in the tournament who are seeded one through sixteen. Before the tournament begins, the player seeded first may be considered the best player participating in the tournament and the player seeded sixteenth may be considered the worst player in the tournament. Each player in bracket 100 is marked as "Player x" where "x" is the player's seed. Although players will be referred to as single players in the sample tournament, it is understood that this invention can apply equally to a doubles tennis tournament. Once the players are seeded, a draw of which players compete against each other may be determined. Although the draw may be determined in any desirable manner, in the described embodiment, the draw is determined in accordance with the seeding of the players. This allows the greatest number of talented or quality players to be in the tournament at any given time. In addition, determining the draw in accordance with the seeding assists the best player in emerging from the tournament as the winner. In the context of this invention, determining the draw in accordance with the seeding may provide a certain level of predictability for the outcome of the tournament. Knowing the outcome of matches in the tournament may aid in allocating event admissions or seats for player's tickets. Thus, techniques for determining the draw will be discussed.

One technique for achieving the objective of the best player emerging from the tournament as the winner is to establish the draw such that the greatest number of players in the top half of the seeding advance in each round. This may be achieved by having players seeded in the top half of the tournament play against players seeded in the bottom half of the tournament. Looking at FIG. 1, in first round 102, players that are seeded one through eight compete against players that are seeded nine though sixteen. If all of the best players win (i.e., all of the top seeded players win), then second round 104 will comprise players seeded one through eight. This would help accomplish the aforementioned objective. In this way, the greatest number of talented or quality players determined before the tournament began may proceed to the next round of the tournament, thus creating a more competitive tournament. Although not illustrated in bracket 100, a certain level of randomness or purposeful adjustment may also be incorporated when establishing the draw such that some players seeded one through eight may play each other and some players seeded nine through sixteen may play each other.

In order to determine which players seeded one through eight are paired to compete against the players seeded nine through sixteen, the objective may be to make the addition of the seeds of each competing pair of player's seeds as close to the same number as possible. Meaning, if Player 1 is playing Player 15, the addition of their seeds is sixteen (i.e., one plus fifteen). Ideally, the addition of the seeds for each match in a round may equal the total number of players in the round plus one. Since there are sixteen players in first round 102, the ideal number when adding the seeds may be seventeen. As illustrated in bracket 100, first seeded player 110 ("Player 1") competes against fifteenth seeded player 112 ("Player 15") in first match 106. Twelfth seeded player 114 ("Player 12") competes against fifth seeded player 116 ("Player 5") in second match 108. The addition of the seeds in first match 106 and second match 108 equals sixteen and seventeen, respectively. The addition of the seeds for the remaining matches of first round 102 in bracket 100 equals between sixteen and twenty. The additions of the seeds are close to seventeen, the number that was previously described as ideal. How close the addition of the seeds may be to the ideal number may be at the discretion of the tournament director. The draw depicted in bracket 100 corresponds to the tournament director choosing to have the addition of these seeds vary randomly around the ideal value of seventeen for this sample sports tournament.

This pairing, or matching, of players to compete against each other may be repeated for the remaining rounds. This arrangement for later rounds may best be understood if it is assumed that all of the best or top-seeded players win. Meaning, in the sample tournament, players seeded one through eight would remain in the tournament for second round 104. The same principle described above may apply here, such that of the players remaining, those seeded in the top half of the tournament may compete against players seeded in the bottom half of the tournament. In second round 104, player pairings may be arranged such that players seeded one through four compete against players seeded five through eight. The ideal number for the addition of the seeds with eight players remaining should be nine (i.e., total number of players remaining in the tournament plus one). As can be seen in bracket 100, if the top-seeded players win first round 102 then fifth match winner 118 may be Player 6, sixth match winner 120 may be Player 3, seventh match winner 122 may be Player 7, and eighth match winner 124 may be Player 2. In this case then, the addition of the seeds in eleventh match 126 and twelfth match 128 both equal nine which may be the ideal number in the second round of the sample tournament. The sum of the seeds in the other second round matches in this case may vary randomly around nine as a consequence of setting the sum of the seeds for the first round matches to vary randomly around seventeen.

This sample tournament described in FIG. 1 is not meant to limit the type of tournament in connection with which the player's ticketing technique of the invention can be used. Rather, it is provided merely for illustrative purposes and for a context in which this invention may be described. Where appropriate, alternate embodiments may be described. For example, the sample tournament comprising sixteen players does not limit this invention to a tournament of only sixteen players. Rather, sixteen players are provided for illustrative purposes and this invention may be used in tournaments of any size. In addition, the technique described for arranging the draw is just one embodiment of how the draw may be established in accordance with the seeding of the players. This invention is not limited to this particular technique and can apply to any technique for which a tournament director chooses to establish the draw. It is, however, desirable to determine the draw of the tournament in accordance with the seeding because many tournaments' draws are established in this manner. As will be described in greater detail below, determining the draw in this manner may provide a certain level of predictability of the outcome of the tournament. However, determining the draw using other techniques which do not rely on seeding may also provide elements of predictability.

This player's ticketing technique may also be applied to other types of tournaments including, but not limited to, a round-robin tournament, any other type of double elimination tournament, or another type of tournament. In these types of tournaments, the probability tables described below in connection with FIGS. 6-8 may incorporate the additional feature that a single loss may not necessarily cause a player to be eliminated from the tournament.

Some of the probabilities useful for issuing player's tickets are illustrated and discussed in connection with FIG. 2. FIG. 2 shows a depiction of bracket 100 in a table format. Table 200 includes round column 201 and match column 202 which show the same four rounds and the same fifteen matches, respectively, illustrated in bracket 100. Since table 200 is a depiction of the rounds and matches in bracket 100, table 200 has the same number of rows (four) in round column 201 as there are rounds in bracket 100. In addition, table 200 has the same number of rows (fifteen) in match column 202 as there are matches in bracket 100. Table 200 includes additional information in Player A column 206, Player B column 208, Player A probability column 210, and Player B probability column 212. Columns 206, 208, 210, and 212 have the number of rows (fifteen) as match column 202 because the information in columns 206, 208, 210, and 212 describe the particulars of each match. Player A column 206 and Player B column 208 may provide the two players competing in each match. For any given match in bracket 100, the two competing players may be arranged in blocks in a vertical position to each other. The player in the top vertical position in bracket 100 may be located in Player A column 206 and the player in the bottom vertical position may be located in Player B column 208. Player A probability column 210 may provide the probability of the player winning the match that is listed in Player A column 206. Player B probability column 212 may provide the probability of the player winning the match listed in Player B column 208.

An examination of row 204, for example, illustrates the correlation between table 200 and bracket 100. Row 204 shows the equivalent match of first match 106 described above. As can be seen, Player 1 is located in table cell 214 which is in Player A column 206. Player 1 in table cell 214 of FIG. 2 is the equivalent of Player 1 (first seeded player 110) in FIG. 1. Similarly, Player 15 is located in table cell 216 in Player B column 208. Player 15 in table cell 216 of FIG. 2 is the equivalent of Player 15 (fifteenth seeded player 112) in FIG. 1. Following the format described above, Player 1 is in Player A column 206 and Player 15 is in Player B column 208 because first seeded player 110 (Player 1) is vertically positioned above fifteenth seeded player 112 (Player 15) in bracket 100.

The format for the remaining rows in table 200, and therefore the remaining matches in bracket 100, may follow the same format as row 204. Row 218 provides an example of a match in the second round in which the players' identities may not be known. Row 218 illustrates eleventh match 126 in second round 104 from bracket 100. As can be seen, fifth match winner 118 (winner of match 5) is located in table cell 220, which is in Player A column 206, and sixth match winner 120 (winner of match 6) is located in table cell 222, which is in Player B column 208. Once again, this follows the aforementioned format where fifth match winner 118 is vertically positioned above sixth match winner 120 in bracket 100.

The data in Player A probability column 210 and Player B probability column 212 may be determined by gathering information from previous tournaments and matches. The data gathered from previous tournaments and matches may be considered "historical data." For tournaments that have been played for many years with an established technique for determining the draw, the probability of a particular seed winning a particular match may be accurately estimated based on the historical performance of this seed. This type of historical probability data may be readily available for major tournaments. If sufficient historical data for the current tournament is unavailable, historical data from similar tournaments may be used instead. The probability of players winning in each particular match in future tournaments may be calculated independently of the identities of the players. The probabilities in columns 210 and 212 may be expressed as a number between zero and one inclusive, a percentage, a probability distribution, a function of other values, or in any desirable manner. In the examples provided in table 200, the probabilities may be expressed as numbers between 0 and 1 inclusive and as probability distributions. For example, as illustrated in table cell 226, it may be established that in the sample tournament from FIG. 1, a player seeded fifteenth has a 5% chance of winning a match in the first round when competing against a player seeded first. Because the probabilities of competing players in a match should desirably total 100%, the corollary that Player 1 has a 95% chance of winning is illustrated in table cell 224. For purposes of discussion herein, the probability may at times be referred to as a percentage. As seen in table cell 228, the probability of Player B winning in match 8 may be expressed as a normal distribution. Since it may be desirable for the probability to total 100% (or one), the corollary is that Player A's probability of winning match 8 may be expressed as one minus the same normal distribution expression for Player B (illustrated in table cell 230).

The probability distributions expressed in table 200 as normal distributions may actually be pseudo-normal distributions. These may be pseudo-normal distributions in that, for the purposes of this invention, they may have the additional constraint of having values between zero and one inclusive. The results from a typical normal distribution equation may include values outside of the zero to one range depending on the chosen mean and standard deviation inputs. Therefore, a pseudo-normal distribution may be provided such that if the typical normal distribution equation results in a value outside of the zero to one range, the value may be replaced with the mean of the normal distribution.

The probabilities provided in table 200 may assume that the chances of a particular player winning a match are independent of the player's identity. However, it may also be desirable to recalculate the estimated probabilities as the tournament progresses and players' identities in later rounds of the tournament become known. The probabilities in the later rounds may be based on certain assumptions about which players will win the earlier rounds. As the tournament progresses, additional information becomes known, such as the current status or form of the remaining players, and may also be used to refine these estimated probabilities. Another approach may be to maintain the same probability estimates that were decided before the tournament began.

These approaches may be illustrated by looking at row 230, for example, which shows the probabilities for match 9 in the second round. In this example, as illustrated in column 210, the winner of match 1 may be considered to have an 80% chance of winning this match regardless of which player wins match 1. Match 1 may be played between Player 1 and Player 15. Although Player 1 has a 95% chance of winning match 1, and may in all likelihood advance to match 9, Player 15 does have a 5% chance of winning. The probability of the winner of match 1 having an 80% chance of winning match 9 may be estimated before the tournament begins. This estimated probability may be largely based on Player 1's 95% chance of playing in match 9. If Player 15 wins match 1, it may reflect that Player 15 is at the same skill level as Player 1 and has an 80% chance of winning match 9. However, it may also be desirable to estimate different probabilities for each match in the second round after the first round matches are completed and the players identities become known.

In addition to calculating the probabilities independently of players' identities based on historical data from previous tournaments, probabilities may also be estimated by other methods. These other estimation methods may be used to complement or replace the method of using historical data to estimate the probabilities in columns 210 and 212. Probabilities may be estimated based on attributes of the players. For example, probabilities may be estimated based on the current form and skill level of the players competing. In addition, other factors that may be relevant in estimating probabilities may be, the following: the results of previous meetings between players, a player's ability on different types of surfaces, a player's record playing as a current rank, a player's record playing against a particular rank, a player's record with the current weather, a player's record depending on the time of year, a player's record when playing in a particular tournament, or any other relevant factor.

FIG. 3 shows table 300 with the player's tickets allocation for each round in the sample tournament. Columns 318, 326, 330, and 332 provide the number of player's tickets allocated in rounds 1, 2, 3, and 4, respectively. Different types of player's tickets may be available. "All-rounds" ticket type 302 may be a player's ticket for a particular player for all rounds of the tournament. For example, row 304 illustrates an all-rounds player's ticket for Player 1. Because one hundred player's tickets have been sold for Player 1, one hundred tickets may be allocated in each round for Player 1 in columns 318, 326, 330, and 332. This idea may be similarly applicable for the other rows in table 300 for ticket type 302 such as rows 320, 322, and 328. Another example is when a player is not allocated any player's tickets, as occurs for Player 16 in row 334.

"Round-'x'-onwards" ticket type 306 may be a player's ticket for a particular player for round "x" onwards of the sample tournament, where x>1. For example, row 308 illustrates a round-"x"-onwards ticket for Player 1 for round 3 onwards. Because fifty player's tickets have been sold for Player 1 for round 3 onwards, and because the sample tournament has four rounds, fifty tickets may be allocated for Player 1 for rounds 3 and 4 in columns 330 and 332. In addition, because in this example the player's ticket is for round 3 onwards, there are no tickets allocated in this example in rounds 1 and 2. This idea may be similarly applicable for the other rows in table 300 for ticket type 306, such as row 324.

Multiple-players' ticket type 310 may be a players' ticket that references multiple players. A ticket holder for this ticket type may attend any match played in by any of the players referenced by the players' ticket. If a players' ticket references multiple players, and any two of the players the ticket references play a match against each other, the ticket holder may be entitled to only one seat for that match. For example, row 312 illustrates a multiple-players' ticket for all rounds for a ticket referencing Players 1 and 2. Because sixty such players' tickets have been sold for a ticket referencing Players 1 and 2, sixty tickets may be allocated in each round for a ticket referencing Players 1 and 2 in columns 318, 326, 330, and 332. This idea may be similarly applicable for the other rows in table 300 for ticket type 310, such as row 316. In addition, the multiple-players' ticket type may be combined with the round-"x"-onwards ticket type. Row 314 illustrates fifteen players' ticket referencing Players 4, 5, and 8 allocated for round 2 onwards. As a result, there may be no tickets allocated for a players' ticket referencing Players 4, 5, and 8 in round 1 in column 318. There may be, however, fifteen tickets allocated for a players' ticket referencing Players 4, 5, and 8 in rounds 2, 3, and 4 in columns 326, 330, and 332, respectively.

The multiple-players' ticket type may also apply to matches where more than two players play in a match. For example, in a doubles tournament more than two players may play in a match. As another example, in a sport such as track and field, more than two athletes may compete in a single event. If a player's ticket references two or more athletes competing in the same event, the ticket holder may be entitled to only one seat for that match.

Other types of player's tickets may be allocated that are not shown in table 300. The examples shown in table 300 are provided for illustration of the invention only and player's tickets types are not limited to those provided. For example, player's tickets may not necessarily be for consecutive rounds. It may be desirable to an individual (i.e., a sports fan) to purchase a ticket for a player in rounds 1 and 4. In addition, it may be desirable to a sports fan to purchase a ticket for a player in a particular round (e.g., Player 1 only in round 2). A multiple-players' ticket may also be issued for a particular round. For example, a multiple-players' ticket for Players 4 and 8 in round 2 would provide admission to a round 2 match being played by Player 4 and/or Player 8. Consistent with the description above, with respect to multiple-players' tickets, if Player 4 and Player 8 play each other in a round 2 match, then only one seat may be provided to the ticket holder for this match. It may also be desirable to a sports fan to purchase a ticket for a player up to a particular round. For example, a player's ticket for Player 1 up to round 3 would entitle a player's ticket holder admission for matches in rounds 1, 2, and 3 if Player 1 is still in the tournament, but not for the final round match, tickets for which may be sold separately. In these scenarios, the player's ticket holder may purchase a ticket to attend less than all of the matches in which a player plays.

As described above, if a players' ticket references two players that play against each other, it may entitle the ticket holder to only one seat. In this scenario, the tournament director may offer other compensation as opposed to multiple seats. For example, the tournament director may offer free or discounted food and beverages, free or discounted credit for novelty games, free or discounted vouchers to outside vendors, passes to restricted areas, free apparel, or any other free or discounted item or entry access. The compensation may vary depending on criteria set by the tournament director. For example, all else being equal, a multiple-players' ticket referencing two players playing each other in the final round of a tournament may receive better compensation than a multiple-players' ticket referencing two players playing each other in an earlier round. In another case, all else being equal, the player's ticket holder for a multiple players' ticket that references only two players, both of whom play each other in the final round, may receive enhanced compensation.

How many player's tickets may be allocated and how the player's tickets may be priced will be discussed in more detail below in connection with FIG. 9.

As discussed above in connection with FIG. 2, an established technique for determining a tournament draw may provide a certain level of predictability in determining which players will win each match in each round. Using historical data, probabilities for which player will win each match may be ascertained and defined before a tournament begins. Computer simulations of the tournament may then be run to determine the various outcomes of each match in each round. From this, the different number of tickets necessary for each match at various levels of confidence may be discovered. These results can guide the tournament director in determining how many seats to make available for each match for player's tickets holders. Essentially, executing numerous computer simulations of a tournament may be used to determine the number of player's tickets required at various levels of confidence for each match.

Simulations of the entire tournament may be run in accordance with the following description, in connection with FIGS. 4 and 5, of a single simulation example of the sample tournament. The simulation example provided in FIGS. 4 and 5 illustrates how many tickets may be required for each match and which player may win each match. Which player may win each match will determine which players will play in subsequent rounds and thus how many tickets may be required in the matches in those rounds.

As a reminder, one of the types of player's tickets available may be the multiple-players' ticket type which references multiple players. Because a multiple-players' ticket referencing two players playing in the same match may entitle the multiple-players' ticket holder to only one seat, the following technique for calculating the number of player's tickets required for a match ensures that a multiple-players' ticket is not counted twice. For a match between Player A and Player B, the number of player's tickets required for the match may be calculated by adding together the number of tickets which reference Player A but not Player B, the number of tickets which reference Player B but not Player A and the number of tickets which reference Player A and Player B.

Looking at FIG. 4, table 400 shows a simulation for the first round of the sample tournament. Match column 402, players column 404 and probability column 406 may contain the same information found for the first round matches in table 200 of FIG. 2. The pseudo-normal distributions for match 2 and match 8 in FIG. 2 have been replaced with randomly selected values from these distributions in probability column 406 for illustrative purposes. Number of player's tickets for each player column 408 contains the number of player's tickets required for each player for that particular match. Total player's tickets column 410 may contain the total number of player's tickets required for that particular match. Score column 414 contains the score for each player which may be used to determine the winner of the match. How the score may be calculated will be discussed below. Winner column 416 may contain the winner of the match between the players found in column 404.

Row 412 may be an example of a match row. For each match row, player column 404 may contain two player numbers. The player listed on top in the match row of player column 404 may be Player A and the player listed on the bottom in the match row of player column 404 may be Player B. Number of player's tickets for each player column 408 may be determined for Player A by adding the number of tickets which reference Player A but not Player B to half of the number of tickets which reference Players A and B. Number of player's tickets for each player column 408 may be determined for Player B by adding the number of tickets which reference Player B but not Player A to half of the number of tickets which reference Players A and B. Adding one half of the number of tickets which reference Players A and B to each of Players A and B's ticket total ensures that a multiple-players' ticket is not counted twice.

Looking at row 412 the number of tickets required for Player A, who in match 1 of round 1 is Player 1, is 190. The number of tickets required for Player B, who in match 1 of round 1 is Player 15, is five. These numbers may be obtained by looking at table 300 of FIG. 3. In table 300, the number of tickets that reference Player A (Player 1), but not Player B (Player 15) may be found in rows 304, 308, 312, and 316. Adding the numbers found in player's ticket allocation for first round column 318 of rows 304, 308, 312, and 316 results in 190 player's tickets (i.e., 100+0+60+30=190). The number of tickets that reference Player 15, but not Player 1 is five and may be found in row 320 of column 318. Note that in this case, no player's ticket references both Player 1 and Player 15. Total player's tickets column 410 may be the addition of the number of player's tickets required for each player for that particular match. Looking back to row 412, the addition of Player 1's player's tickets and Player 15's player's tickets' is 195, and is found in column 410.

In order to determine who is the winner of each simulated match, each of Player A and Player B may receive a score. The score for Player A may be determined by multiplying the probability of Player A winning the match by a random number greater than or equal to zero and less than or equal to one. The score for Player B may be determined in a similar manner. A new random number should be generated for multiplication by each of Player A's and Player B's probabilities.

Once the players' scores are determined, the scores may be compared. Whichever player's score is higher may be declared the winner of the match. If the players' scores are equal then a tie-breaking procedure may be used. For example, in the case of a tie, it may be decided by convention that Player A always wins, Player B always wins, the winner is determined by who has the higher seed, or by any other tie-breaking determination. Looking back to row 412, winner column 416 shows that in match 1, Player 1 is the winner because in score column 414 the score associated with Player 1 (0.827) is greater than the score associated with Player 15 (0.028). A similar winner determination may be performed for each match in the first round. The winners of each match in the first round may advance to the second round.

In FIG. 5, tables 500, 512, and 518 show simulations for the second round, third round, and fourth round, respectively, of the sample tournament. In table 500, match column 502 may show matches 9, 10, 11, and 12 which appear in match rows 520, 522, 524, and 526, respectively. To determine which players compete in matches 9, 10, 11, and 12, attention is drawn to FIG. 2. Table 200 of FIG. 2 shows that the winner of match 1 plays the winner of match 2 in match 9, the winner of match 3 plays the winner of match 4 in match 10, the winner of match 5 plays the winner of match 6 in match 11, and the winner of match 7 plays the winner of match 8 in match 12. The winners of each of these matches may be found in winner column 416 of table 400 in FIG. 4.

Similar to FIG. 4, in FIG. 5, the player listed on top in the match row of players column 504 may be Player A and the player listed on the bottom in the match row of players column 504 may be Player B. In this sample simulation, row 520 indicates that in the second round, Player 1 (winner of match 1) will be Player A and will play Player 5 (winner of match 2) who will be Player B. Row 522 indicates that Player 4 (winner of match 3) will be Player A and will play Player 8 (winner of match 4) who will be Player B. Row 524 indicates that Player 10 (winner of match 5) will be Player A and will play Player 3 (winner of match 6) who will be Player B. Row 526 indicates that Player 7 (winner of match 7) will be Player A and will play Player 2 (winner of match 8) who will be Player B.

Probability column 506 in table 500 may contain the probabilities for the second round matches from table 200 of FIG. 2. The pseudo-normal distributions for match 12 in FIG. 2 have been replaced with randomly selected values from these distributions in probability column 506 for illustrative purposes. Number of player's tickets for each player column 508 and total player's tickets column 510 may be similar to columns 408 and 410 of FIG. 4 and may be calculated in a similar manner. Looking at row 522, for example, the number of tickets required for Player A, who in match 10 of round 2 is Player 4, may be 77.5. The number of tickets required for Player B, who in match 10 of round 2 is Player 8, may be 67.5. These numbers for required player's tickets may be derived by looking at table 300 of FIG. 3. In table 300, the number of tickets that reference Player A (Player 4), but not Player B (Player 8) may be found in rows 322 and 324. Adding the numbers found in player's ticket allocation for second round column 326 of rows 322 and 324 results in seventy player's tickets (i.e., 70+0=70). The number of tickets that reference Player 8, but not Player 4, is sixty and may be found in row 328 of column 326.

Note that in this case, a multiple-players' ticket type references players 4 and 8. In row 314, fifteen multiple-players' tickets referencing players 4, 5, and 8 may be allocated for round 2 in column 326. Therefore, half of these multiple-players' tickets may be allocated to Player 4 and half of these multiple-players' tickets may be allocated to Player 8. Splitting the tickets for each player illustrates the embodiment in which a multiple-players' ticket referencing two players playing each other in a match entitles the players' ticket holder to only one admission or seat. In a sense, this converts a multiple-players' ticket to a player's ticket for the purpose of calculating each player's total number of tickets. In this case, because an odd number (i.e., fifteen) of multiple-players' tickets referencing two players playing each other were sold, one half of a ticket is shown to be allocated for each player. In actuality, one half of a ticket cannot be issued. This half of a ticket is merely to show the allocation of each player's total number of tickets for a match and the two halves of a ticket are accounted for when considering the total number of player's tickets for the match. Thus, 7.5 tickets may be allocated to each of Player 4 and Player 8. Therefore, the total number of tickets allocated for Player 4 is 77.5 (i.e., 70+7.5=77.5) and the total number of tickets allocated for Player 8 is 67.5 (i.e., 60+7.5=67.5).

Total player's tickets column 510 may be the addition of the number of player's tickets required for each player for that particular match. As illustrated in row 522 of column 510, the addition of Player 1's player's tickets and Player 15's player's tickets is 145 (i.e., 77.5+67.5=145), and is found in column 510.

Similar calculations regarding player's tickets may then be computed for the remaining matches in the second round. In addition, similar determinations regarding the player's scores and which player is the winner of each match in the second round may then be made, as described in connection with the scores and winners in FIG. 4. The winners of each match in the second round may advance to the third round. Tables 512 and 518 show simulations for the third round and fourth round, respectively, of the sample tournament. The simulations shown in tables 512 and 518 may be performed similarly to that of table 500.

The description associated with FIGS. 4 and 5 describe one simulation of an entire sample tournament. FIGS. 6-8 illustrate 3,000 iterations of simulations of the entire sample tournament and the data associated with those iterations. The tie-breaking procedure adopted for these simulations where the players' scores may have been equal was to declare Player A the winner of those matches. Running 3,000 iterations simulating the sample tournament has been done for illustration of the invention only and is not meant to limit the invention. The tournament may be run for any desired number of iterations, but should preferably be run for enough iterations for the results to be statistically significant. All else being equal, a larger number of iterations of the sample tournament will result in a smaller margin of error in the output statistical results. This margin of error may be expressed by calculating a confidence interval (e.g., a 95% confidence interval) for each output result using standard statistical techniques (not shown). Besides the number of iterations, this margin of error may also be affected by the accuracy of the methods used to simulate the tournament.

Table 600 of FIG. 6 shows how many player's tickets are required in the matches for the first round. Regardless of the number of iterations of the sample tournament run, these numbers are known because the players in the first round matches are known.

Table 602 of FIG. 6 shows the different options of seats that may be required for player's ticket holders in second round matches. Unlike the first round where the player pairings may be known prior to the start of the tournament, the player pairings may not be known in the later rounds until the matches which determine these player pairings have been played. Therefore, in order to determine how many tickets to allocate in matches where the players are unknown, the possible player pairings must be considered. As an example, looking back to FIG. 2, row 230 indicates that in match 9, Player A may be the winner of match 1 and Player B may be the winner of match 2. The winner of match 1 may either be Player 1 or Player 15 and the winner of match 2 may be either Player 12 or Player 5. Therefore, match 9 may have four possible pairings of players: (1) Player 15 vs. Player 12; (2) Player 15 vs. Player 5; (3) Player 1 vs. Player 12; and (4) Player 1 vs. Player 5. The number of tickets required for each of the four different pairings may be calculated in accordance with the technique described above in connection with FIGS. 4 and 5.

An examination of row 604 of table 602 will illustrate compiled simulation data for match 9 in the second round. The below discussion and examples associated with match 9 are provided merely for illustration purposes. This description is not provided to limit the invention, but rather expound upon the manner in which player's tickets may be allocated. In addition, the principles discussed in connection with match 9 may be applied equally to the other matches in the second round and the other rounds in the tournament.

As indicated in row 604 of table 602, there may be four different options of player's tickets required for match 9. These four different options may correspond to the four possible pairings. Although four different options of player's tickets may be required in the examples provided in row 604 of table 602, there may be fewer than four different options for a match (not shown). For example, if two of the pairings require the same number of tickets then there may only be three different options for the number of player's tickets required. Sub-row 606 may correspond with pairing #1 from above (i.e., Player 15 vs. Player 12), sub-row 608 may correspond with pairing #2, sub-row 610 may correspond with pairing #3, and sub-row 612 may correspond with pairing #4. Columns 614, 616, and 618 show the details of the 3,000 iterations of the sample tournament specific to the different matches in column 620. Column 614 may show the four different options of the number of seats required for player's tickets holders for a particular match. Column 616 may show the number of times each of the four possible pairings occur in 3,000 iterations of the sample tournament.

For example, sub-row 606 indicates in column 614 that one option may be that 25 seats are required for player's tickets holders in match 9 (i.e., twenty-five seats are required for player's ticket holders when Player 15 plays Player 12). For sub-row 606, column 616 indicates that Player 15 played Player 12 in 11 of the 3,000 iterations of the sample tournament run. Sub-row 608 indicates that 120 seats are required for player's tickets in match 9 when Player 15 plays Player 5. Column 616 indicates that 120 seats are required 63 times in the 3,000 iterations of the sample tournament run. Sub-row 610 indicates that 210 seats are required in match 9 when Player 1 plays Player 12. Column 616 indicates that 210 seats are required 490 times in the 3,000 iterations of the sample tournament run. Sub-row 612 indicates that 305 seats are required in match 9 when Player 1 plays Player 5. Column 616 indicates that 305 seats are required 2,436 times in the 3,000 iterations of the sample tournament run.

Column 618 may show the percentage of times that allocating "n" number seats will accommodate all player's ticket holders for a particular match. The percentages shown in column 618 may be considered probability distributions of the number of seats required to accommodate all player's ticket holders for a particular match. In match 9 in the second round, the value for "n" may be one of the four possible ticket options listed in column 614 in sub-rows 606, 608, 610, or 612. For example, 25 tickets may be allocated for match 9. Allocating player's tickets may mean that "n" seats are set aside for player's ticket holders for that match. The location of the "n" number of seats is discussed in more detail below. In addition, the use of the term "seats" is not meant to limit the allocation to "seats." Certain venues may be standing-room only, for example. Therefore, allocation of seats may refer to any type of allocation of event admissions or entry passes.

Looking back at the example in row 606 of column 616, only 11 times out of 3,000 iterations of the sample tournament will 25 seats accommodate all player's ticket holders. That is, only about 0.4% of the time (i.e., 11 out of 3,000) will all player's tickets for match 9 be accommodated through the allocation of 25 seats for player's ticket holders. This value is listed in sub-row 606 of column 618. All player's tickets for match 9 may be accommodated when Player 15 plays Player 12 (i.e., pairing #1 from above) if 25 seats are allocated. If any of the other three possible pairings occur, all ticket holders of player's tickets that are valid for match 9 may not be accommodated. In fact, only 25 player's ticket holders out of 120, 210 or 305 player's ticket holders will be accommodated, depending upon which players are playing in match 9.

If, on the other hand, 120 seats are allocated for player's ticket holders for match 9, then this will accommodate all player's ticket holders 74 times out of 3,000 iterations of the sample tournament. As indicated in column 616 of sub-row 608, Player 15 plays Player 5 (i.e., pairing #2) 63 times out 3,000 iterations. As noted above, when Player 15 plays Player 5, 120 seats are necessary for match 9. In addition, if 120 seats are allocated for player's ticket holders for match 9, and Player 15 plays Player 12 (i.e., pairing #1), all player's ticket holders for this possibility will also be satisfied. Since there are only 25 player's tickets that refer to Player 15 and/or Player 12 for match 9, there may in actuality be an excess of 95 seats. Therefore, from column 616 both the 11 iterations and the 63 iterations from sub-rows 606 and 608, respectively, may be used in calculating the percentage for sub-row 608 of column 618. That is, this value should be about 2.5% (i.e., (11+63=74) out of 3,000).

This same logic may apply for the remaining seat requirement options in column 614. For example, as illustrated in sub-row 610, if 210 seats are allocated for player's ticket holders for match 9 of the tournament, this may accommodate all player's ticket holders about 18.8% of the time. That is because 210 seats are required when Player 1 plays Player 12 (i.e., pairing #3). If 210 seats are allocated and the players pairing is pairing #1 or pairing #2, both of which require fewer than 210 tickets, then player's ticket holders with these pairings may still be accommodated. Since Player 1 plays Player 12 490 times out of 3,000 iterations in column 616 of sub-row 610, the value for column 618 of sub-row 610 is 18.8% (i.e., (11+63+490=564) out of 3,000).

Finally, if player 1 plays player 5 (i.e., pairing #4) in match 9, then 305 player's tickets may be required to accommodate all player's tickets that reference player 1 and/or player 5 for match 9. In this situation, if 305 seats are allocated, column 618 of sub-row 612 indicates that all player's ticket holders may be accommodated 100% of the time. Because 305 seats may be available for player's tickets referencing match 9, if pairings #1, #2, or #3 occur, all of which require fewer seats than the 305 seats required in pairing #4, then all player's ticket holders may be accommodated.

As seen in the last example, more seats may be allocated than may be required resulting in excess seats being available. In this scenario the unused seats allocated for player's tickets may be made available to the general public as ordinary tickets (e.g., general admission, reserved tickets, unreserved tickets, etc.). Alternatively, these seats may be made available as part of a player's ticket option. These mitigation techniques will be discussed in more detail below.

Table 700 of FIG. 7 shows the different options of seats that may be required for player's ticket holders for the matches in the third round. Columns 704, 706, and 708 may provide the same type of information of 3,000 iterations of the sample tournament for round 3 as columns 614, 616, and 618 provided for round 2. As shown, there may be more options (i.e., sub-rows in table 700) for the number of seats required for player's ticket holders in the third round than in the second round. As the rounds progress there may be more options because there are a greater number of combinations of pairs of players that may be playing in these later round matches.

Table 800 of FIG. 8 shows the different options of seats that may be required for player's ticket holders in match 15 in the fourth round. In the sample tournament, the fourth round may be the last round of the tournament and, therefore, may only include one match (i.e., match 15). As can be seen in sub-rows 802, 804, 806, and 808, looking at columns 810 and 812, respectively, allocating 310 seats may satisfy all player's ticket holders about 54.8% of the time, allocating 330 seats may satisfy all player's ticket holders about 75.1% of the time, allocating 340 seats may satisfy all player's ticket holders about 76.6% of the time, and allocating 395 seats may satisfy all player's ticket holders 100% of the time.

Figure 12:
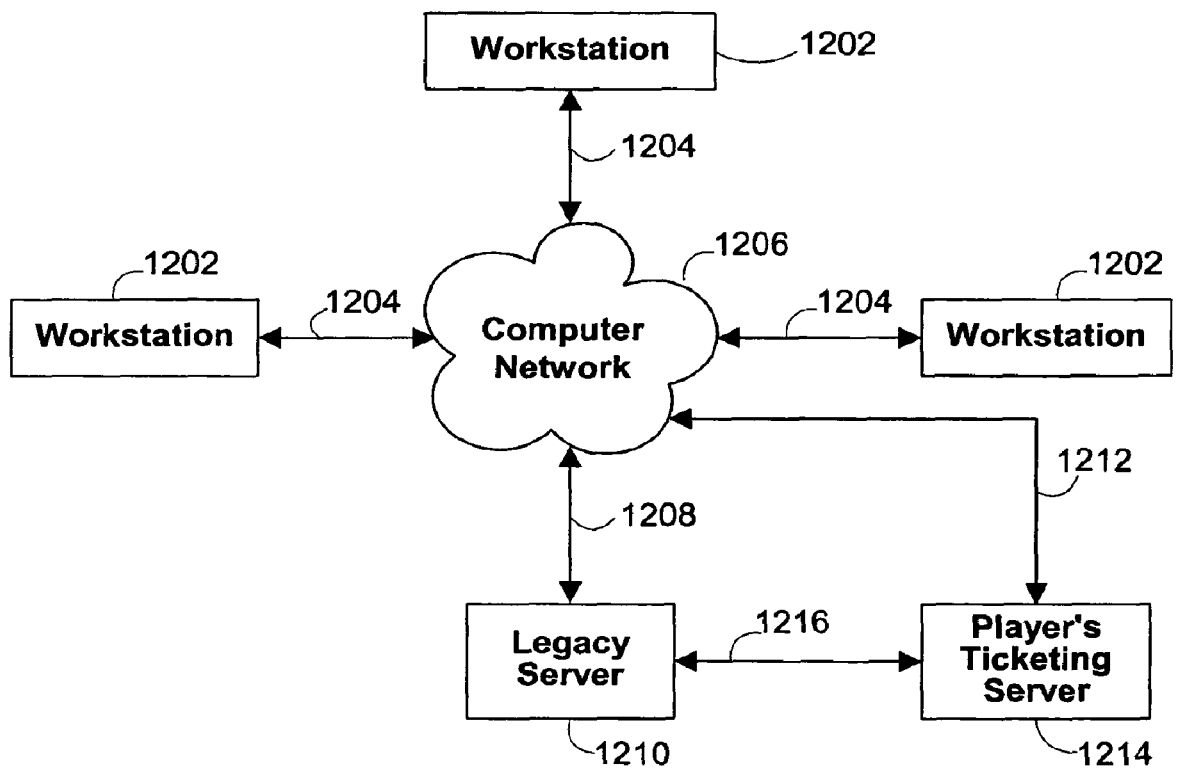
FIG. 12 is a block diagram of a system that may be used to implement processes and functions of certain embodiments of the present invention.
Figure 13:
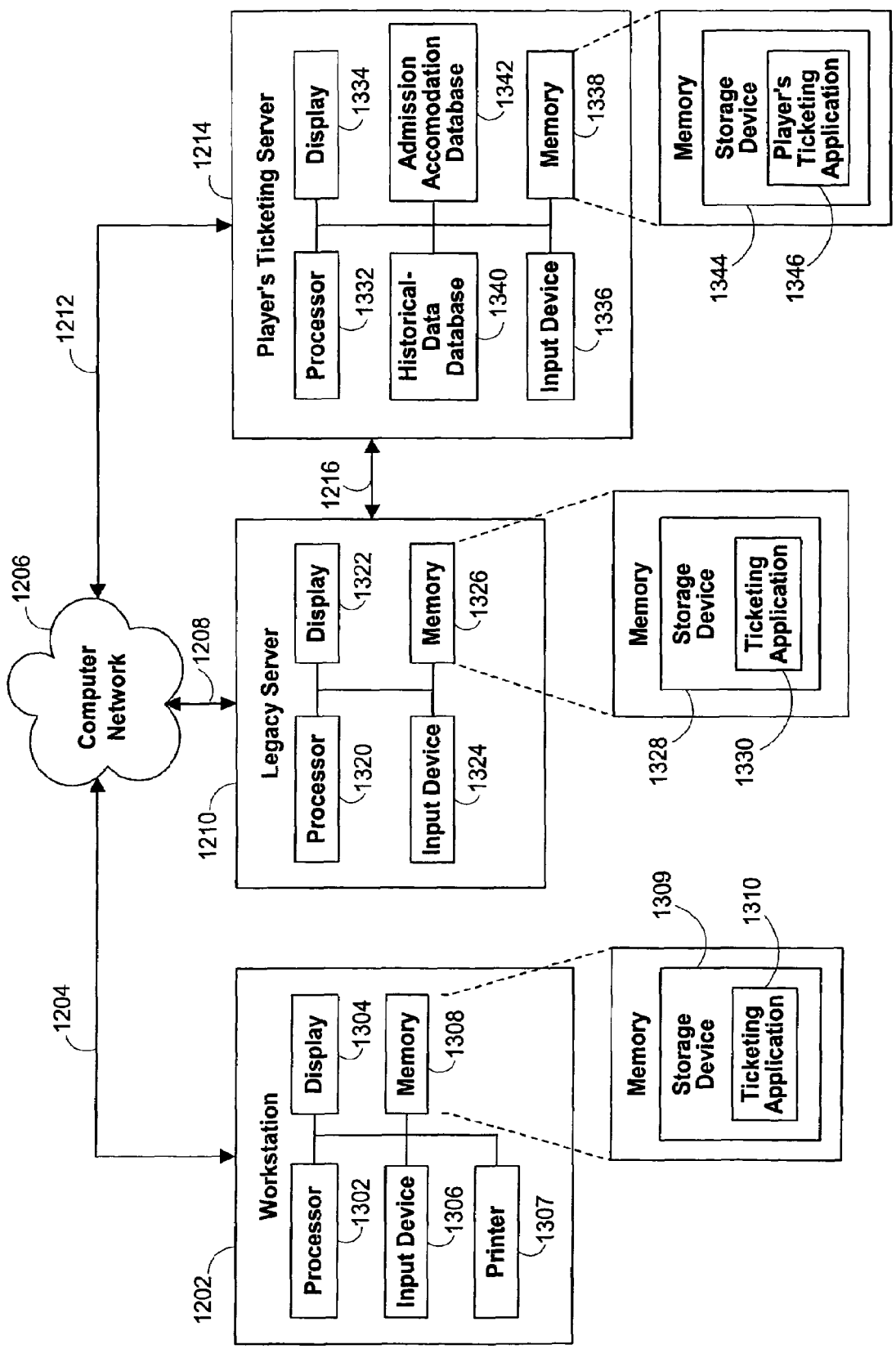
FIG. 13 is a block diagram of a workstation, a legacy server, and a player's ticketing server that may be used to implement the processes and functions of certain embodiments of the present invention.

The decision of how many seats to allocate for player's ticket holders may be made by computer logic within the ticketing application or player's ticketing application. As will be described in more detail below, the ticketing application and player's ticketing application may be located in legacy server 1210 and player's ticketing server 1214 (as illustrated in FIGS. 12 and 13). These applications may request various inputs from the tournament director in order to determine how many seats to allocate for a match. The inputs may allow these ticketing applications to determine which level of confidence with which to allocate seats (i.e., choose the percentage of times that all player's ticket holders will be accommodated correlating to the tournament director's preferences set forth by the inputs).

For the sake of simplicity, processes performed by the ticketing application and the player's ticketing application will be referred to as being performed by the ticketing application, but can be performed by either application as desired. Details regarding these applications will be discussed below in connection with FIG. 13. Many of the determinations made by the ticketing application are dependent upon the inputs of the tournament director. These inputs may explicitly state various conditions under which the ticketing application should allocate a certain number of seats for player's ticket holders with certain levels of risk of not accommodating all player's ticket holders or certain levels of risk of having an excess of seats for player's ticket holders. Alternatively, these inputs may provide guidance to the ticketing application as to the tournament director's willingness to risk not accommodating all player's ticket holders or having an excess of seats for player's ticket holders. Based on these explicitly stated conditions or guidance from the tournament director, the ticketing application may determine how many seats to allocate for player's ticket holders. Determining how many seats may be allocated, and mitigation techniques for use when too many or too few seats are allocated, will be discussed in further detail below.

In the example from FIG. 8, the ticketing application may allocate 330 seats as opposed to 310 seats for player's ticket holders because this would significantly increase the likelihood that all player's ticket holders will be satisfied from about 54.8% of the time to about 75.1% of the time. The ticketing application may determine that this is beneficial because only a small increase in seats allocated produces a large increase in the likelihood of accommodating all player's ticket holders. The ticketing application may determine that increasing the player's ticket holders allocation to 340 seats may not be beneficial because it only increases the likelihood that all player's ticket holders will be satisfied by about an additional 1.5% of the time to about 76.6% of the time. The ticketing application may determine that this is not beneficial because it is a small increase in seat allocation producing only a small increase in the likelihood of accommodating all player's ticket holders. The ticketing application may determine that it is more beneficial to allocate those seats for ordinary ticket sales. The ticketing application may also determine that increasing the ticket allocation to 395 seats to ensure that 100% of all player's ticket holders are accommodated may not be beneficial based on inputs of the tournament director. The tournament director may decide it may be worth risking not accommodating all player's ticket holders and may provide measures of accommodating ticket holders if there are too many player's tickets for seats allocated. However, for other reasons, the ticketing application may determine that it is necessary to ensure that 100% of all player's ticket holders are accommodated.

The allocation of seats for player's tickets for each match in each round, as described above, may be computed before the tournament commences. This seat allocation may persist throughout the tournament. Alternatively, as the tournament progresses and the identities of the winners of various matches become known, the probability distributions of the number of seats required for player's ticket holders for each match may be estimated with greater precision. The estimations may be more precise because, as the tournament progresses, certain players will be eliminated. The possible seat allocation options may then decrease because with fewer players remaining in the tournament, fewer possible pairings of players exist. Fewer possible seat allocation options for a match remain because the seat allocations for eliminated players may not be considered in determining the percentage of times that all player's ticket holders are accommodated. The probability distributions of required seats may also be more precise if estimated as the tournament progresses because the identities of the players in the later rounds may be known. Having the identities of the players may allow the probabilities to be recalculated more precisely. Recalculations of these probabilities may be based on any historical data, as discussed above in connection with FIG. 2.

In addition, new data or information may become available as the tournament progresses which may affect the probability of a player winning. Some examples may be an injury to a player, change in weather conditions which may favor a particular player, how a player matches up against an unexpected opponent, or any other new data which may affect this probability. Because these recalculations may affect the probabilities of a player winning in the simulations of the tournament, it may ultimately impact the percentages of times all player's ticket holders may be accommodated. As the tournament progresses, this may impact how many seats the ticketing application sets aside for player's ticket holders. The refinement of these estimations may be performed after each round completes, after each match completes, or at any desired stage of a tournament.

The type, price, and quantity of player's tickets the tournament director offers for sale may depend upon information the ticketing application can obtain based on an analysis of the marginal revenue curve, marginal cost curve, and demand curve for each type of player's ticket, as well as the profitability of each type of player's ticket. Economic theory suggests that the goal of the tournament director will be to maximize profits. The Equimarginal Principle in Economics states that if a venture is possibly profitable, the profits from pursuing that venture will be maximized at the point where the venture's marginal cost equals the venture's marginal benefit.

Figure 9:
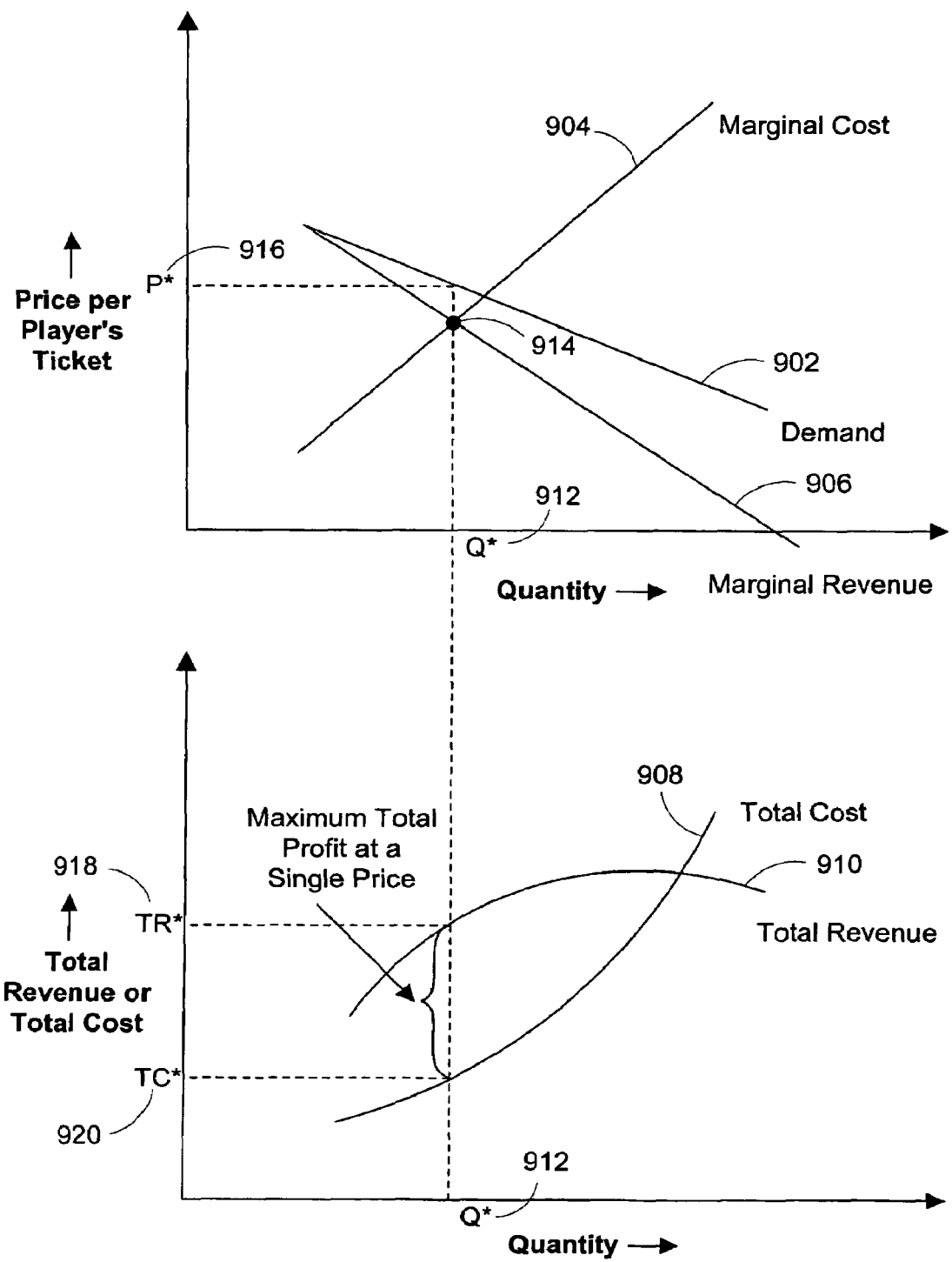
FIG. 9 is an illustration of a demand curve, marginal cost curve, marginal revenue curve, total cost curve, and total revenue curve for a player's ticket in accordance with certain embodiments of the present invention.

FIG. 9 shows graphs 900 of the demand curve 902, marginal cost curve 904, marginal revenue curve 906, total cost curve 908, and total revenue curve 910 for a given type of player's ticket. If it is profitable to issue this type of player's ticket, then the number of such tickets issued should desirably be Q* 912 because it is at quantity Q* 912 that marginal revenue equals marginal cost (i.e., at point of intersection 914 where marginal revenue curve 906 intersects marginal cost curve 904). If a single price is to be charged for this type of player's ticket, then the price at which these tickets should desirably be issued is price P* 916 because P* 916 is the price corresponding to quantity Q* 912 on demand curve 902 for this type of player's ticket. Because Total Profits=Total Revenue−Total Cost, the maximum profits possible from issuing this type of player's ticket at a single price are the difference between TR* 918 and TC* 920, where TR* 918 and TC* 920 are, respectively, the total revenue and total cost corresponding to the issuance of Q* 912 player's tickets at price P* 916 as illustrated in FIG. 9. In practice, various simulations may be run or various formulas may be used by the ticketing application to calculate best estimates of demand curve 902, marginal cost curve 904, marginal revenue curve 906, total cost curve 908, and total revenue curve 910 depicted in FIG. 9.

This economic analysis may be performed by the ticketing application for all types of player's tickets and the results of this analysis should be used to determine the quantity and price of each type of player's ticket to be issued. The number of player's tickets of various types to be issued may then be established and listed as in FIG. 3. This analysis may also be used to estimate the profit to be made from issuing player's tickets. It may be that some types of player's tickets are never profitable to issue. This may occur, for example, due to the high fixed costs of issuing some types of player's tickets. Regardless of whether the marginal cost and marginal revenue for a particular type of player's ticket are ever equal, due to the high fixed costs of issuing this particular type of player's ticket, it may never be profitable and this particular type of player's ticket should not desirably be issued. An example of this situation may occur for the all-rounds player's ticket for Player 16 since no such player's tickets referencing Player 16 are listed in FIG. 3. Another example of high fixed costs possibly being prohibitive in issuing player's tickets may occur if a tournament director decides to offer new types of player's tickets. In this situation, there may be high fixed costs associated with upgrading the ticketing application to enable providing new types of player's tickets. The refinement of this economic analysis for both profitable and unprofitable player's tickets may be performed by the ticketing application after each round completes, after each match completes, or at any desired stage of a tournament.

One consequence of the Equimarginal Principle discussed above is that if a player's ticket remains profitable to issue, then desirably only changes in marginal cost and/or marginal revenue would change the quantity issued of a particular type of player's ticket. Further, while it has been assumed thus far that a given type of player's ticket is offered for sale at a single price, there may be cases where tournament directors may increase their profits by practicing price discrimination. Price discrimination occurs when different prices are charged for the same item (e.g., by charging higher prices for player's tickets sold on the day of the tournament, by charging lower prices for a senior citizen or a student, by providing volume discounts to customers who buy a large number of tickets, etc.). If price discrimination is practiced, then a given type of player's ticket might effectively be sold at various prices rather than a single price. If price discrimination is practiced, then the number of player's tickets sold may exceed Q'.

An important component of the marginal costs associated with a given type of player's ticket may be the opportunity cost associated with forgone profits from the ordinary tickets that each additional player's ticket is expected to replace. Typically, each tournament venue will have a limited capacity and, to maximize profits, it may be desirable to have the ordinary tickets and the player's tickets for a match fill all available seats for that match. Accordingly, each player's ticket issued will replace one ordinary ticket in every match in which the player's ticket is used. The greater the expected number of matches that a player's ticket is used for, the greater the expected number of ordinary tickets that will be replaced in this manner. Therefore, the issuance of a player's ticket will cause the tournament director to forgo earning the profits that would have been earned if one or more ordinary tickets had been issued instead of this player's ticket. These forgone earnings may be part of the marginal cost of issuing each additional player's ticket, and will thus affect the price P* and quantity Q*.

Marginal revenue curve 906 may lie below demand curve 902 as shown in FIG. 9 and may be influenced by the same factors that influence demand curve 902. Accordingly, any factor which increases demand may increase marginal revenue and any factor which decreases demand may decrease marginal revenue. Some factors which may influence demand curve 902 and marginal revenue curve 906 are discussed below.

An increase in the popularity of a player may, all else being equal (e.g., the same ticket type at the same price), increase the demand for player's tickets for that player. The popularity of a player may be related to the quality or talent of that player, how well-known to sports fans that player may be, if a player is hyped, if that player is new and up-and-coming, or any other popularity criteria. For example, if new information concerning a particular player's romantic involvement with a prominent actor is made public, this may lead to that player becoming more well known. This may lead to an increase in the popularity of that player which may in turn lead to an increase in demand for player's tickets for that player. A popularity index may be determined for each player to aid in quantifying the demand for player's tickets for each player.

The demand for a player's ticket may depend upon the type of player's ticket. As described above, two types of player's tickets may be the all-rounds ticket type and round "x" onwards ticket type, where x>1. All else being equal, if the only difference between two player's tickets is the number of rounds they are valid for, then player's tickets valid for more rounds may be in greater demand than player's tickets valid for fewer rounds. For example, assuming the player's tickets are priced the same, an all-rounds (i.e., valid for rounds 1-4) player's ticket for Player 1 may be in greater demand than a player's ticket for Player 1 that is valid for rounds 3 and 4 only.

Similarly, the demand for a player's ticket may be influenced by the number of matches a player is expected to play in. More specifically, if all else is equal (e.g., same ticket type, which thus has the same number of potential matches, at the same price, for players of equal popularity), a player's ticket for a player expected to play in more matches may be in greater demand than a player's ticket for a player expected to play in fewer matches. For example, consider player's tickets sold for Player C and Player D. In this example the player's ticket is sold at the same price and is valid for all four rounds of the sample tournament described above. In addition, for this example assume Players C and D are equally popular and the only significant variation between these two player's tickets is that Player C is expected to play in more matches than Player D in this tournament. Based on historical data, Player C may be expected to play in 3.5 matches and Player D may be expected to play in 2.3 matches. Because Player C is expected to play in more matches than Player D, the demand for the player's ticket for Player C may be greater than the demand for the player's ticket for Player D.

Taking this a step further, the expected number of matches that two players may play in may be equal or sufficiently close that it may seem equal to a sports fan. However, looking at historical data, these two players may have arrived at this expected number of matches differently. One player may, for example, consistently win in the first two rounds of the tournament, but only in rare instances advance past the third round. Another player may be more sporadic in performance. At times, the player may lose in the first or second round, but at other times may reach the third or fourth round. Despite their different winning tendencies, their expected number of matches may be equal. This difference in winning tendencies may be quantified by the standard deviation of the number of matches in which these two players may play. In the above example, the standard deviation will be lower for the more consistent player.

As an example, consider that the expected number of matches that Player C and Player D play in may be equal (e.g., 2.5 matches) for the sample tournament discussed above. The standard deviation of the number of matches that are played in may be less for Player C (e.g., standard deviation=0.2) than Player D (e.g., standard deviation=1.5). Player C's lower standard deviation may be like the consistent player described above, whereas Player D's higher standard deviation may be like the more sporadic player described above. All else being equal (e.g., same ticket type, which thus has the same number of potential matches, at the same price, for players of equal popularity, for players expected to win the same number of matches, etc.), the demand for player's tickets for Player C may be greater than the demand for player's tickets for Player D based on Player C's lower standard deviation. In other words, all else being equal, there may be greater demand for player's tickets for the more consistent player.

The expected number of matches may be determined differently in some types of tournaments where certain players may get a "bye" (i.e., automatic advancement to the next round of the tournament). In one embodiment, the expected number may be the expected round that a player advances to rather than the number of matches played in. This embodiment considers that a sports fan may attach greater importance to seeing later round matches. In another embodiment, the expected number may include the round that is the bye round, but may count that match as less than one match when determining the expected number of matches.

If the only difference between two multiple-players' tickets is that one of the tickets may potentially provide access to more matches, then the multiple-players' ticket potentially providing this greater access may be in greater demand. For example, all else being equal (e.g., tickets are sold at the same price, tickets reference the same number of rounds, etc.), a multiple-players' ticket referencing Players C, D and E may be in greater demand than a multiple-players' ticket referencing Players C and D as long as the multiple-players' ticket referencing Players C, D and E may potentially provide access to additional matches.

The above description of some of the economic considerations involved in issuing player's tickets is not meant to be an exhaustive discussion of such considerations. Rather, it is provided for illustration of the invention. Depending on the situation, the ticketing application may analyze its economic choices differently from the discussion above. This may result in, for example, different pricing strategies from those discussed above. As another example, in some cases, the ticketing application may choose to impose a cap on the number of tickets that can be sold for each type of player's ticket. The imposition of such a cap may affect the economic considerations associated with issuing player's tickets and so may result in changes in the quantity of player's tickets issued and prices of various player's tickets.

Depending upon how many seats are allocated for player's tickets holders for each match, there may be a shortfall or an excess of seats required for player's tickets holders for a particular match. The number of seats allocated for each match may be determined by the ticketing application based on the probability distributions of accommodating all player's ticket holders as described in connection with FIGS. 6-8. Assume the number of seats for a match allocated for player's ticket holders is "x" and the number of seats required for player's ticket holders is "y." If x=y, then there may be no shortfall or excess and all player's ticket holders are accommodated. If y<x, then there may be an excess in the number of seats for player's tickets and extra seats available in the venue for that match. This scenario may be mitigated by selling tickets for up to x−y seats for that match.

These excess tickets may be sold as soon as it is known that there are excess seats available for that match. The sale of unused seats (i.e., x−y seats) may be made available as ordinary tickets or may be "repackaged" as part of a new player's ticket. The new player's ticket option may be available if the unused seat is in a match that is not in the last round of a tournament. The number of player's tickets to be issued may be decided through the economic analysis discussed above.

If x<y, then there may be a shortfall in y−x number of seats for player's tickets in the venue for that match. This scenario may be mitigated by using unsold seats allocated for ordinary ticket holders to seat player's ticket holders. Compensation may also be provided to ordinary ticket holders or player's ticket holders in exchange for the ordinary ticket holders' or player's ticket holders' seats. Compensation may be provided by buying back the ordinary ticket holders' or player's ticket holders' seats. In this scenario the tickets may be bought back at their original selling price, the tickets may be bought back at a higher price, the tickets may be bought back at their original selling price with other compensation, the tickets may be exchanged for vouchers to purchase tickets for another tournament for a value greater than the ticket price, or any other way of buying the tickets back may be used. The other compensation provided with the refund for the ordinary tickets may be the option to buy better seats for another match or any other credit the tournament director may offer.

Another mitigation option available may be to provide player's tickets which guarantee a seat for all matches they are potentially valid for, player's tickets which guarantee a seat for some but not all of the matches they are potentially valid for, and player's tickets which do not guarantee a seat for any match they are potentially valid for. The player's tickets for each of these options may be priced accordingly. All else being equal (e.g., including the players referenced by the player's tickets and the number of matches the player's tickets are potentially valid for), player's tickets which guarantee a seat for more matches may be priced higher than player's tickets which guarantee a seat for fewer matches. If desired, player's ticket holders with non-guaranteed seats that are unable to view a match may be compensated through cash payments, credit for tickets for another match, credit for merchandise, or any other compensation technique. With this mitigation option, it may be beneficial to provide for three different allotments, or classes, of seats for player's tickets in accordance with the seat allocation results set forth in FIGS. 6-8. In this scenario, it may be beneficial to run separate computer simulations of a tournament for each allotment. For the cases when a player's ticket may guarantee a seat, seats may be allocated in which 100% of the time all player's ticket holders may be accommodated. If there is then an excess in the number of seats, the mitigation strategies described above may be employed. In the cases when a player's ticket may not guarantee a seat, the ticketing application may determine, in accordance with the principles described herein above, to allocate seats in which less than 100% of the time all player's ticket holders may be accommodated.

Other class-based ticket allotments may also be established in accordance with the principles of the present invention. Classes of seats may be established based on the quality of the seats. The quality of the seats may be based on location (e.g., courtside seats may be considered better than seats in the tier level), services provided at the seats (e.g., luxury box seats), or any other seat quality determination. All else being equal, the price for seats that may be considered higher quality may be higher than for seats that may be considered lower quality.

Similar to the guaranteed-seat, partially-guaranteed seat, and non-guaranteed seat player's ticket class allotments, it may be beneficial to run separate computer simulations of the tournament for each of the classes of tickets. It may be desirable to have other classes of tickets not discussed herein. The principle of running separate simulations for each class of tickets may apply equally to those classifications of tickets.

In addition, different classes of tickets may be combined to form hybrid classes of tickets. For example, it may be desirable to have a class of tickets that are guaranteed and courtside. Because these tickets may be more desirable than seats that are non-guaranteed and in the tier level, the guaranteed, courtside tickets may be priced higher.

Another factor to consider in allocating seats for player's ticket holders may be events external to the tournament. Events external to the tournament may be that a match may occur at the same time as a concert, other sporting event, or other large event, the weather forecast may be negative, there may be construction on the roads near the match, or any other external event that may limit or enhance why player's ticket holders may attend a match. In the situation where the external event may limit why player's ticket holders may attend a match, the ticketing application may "dampen" the probability distributions calculated for a particular match.

FIG. 10 shows the dampening effect on match 12 in the second round as an illustration of how to dampen the seat allocations for the probability distributions. Columns 1004 and 1006 provide the same information found in columns 616 and 618 of table 602 in FIG. 6 for match 12. The information provided in column 1002, differs in that the number of tickets allocated in column 1002 may be 25% less than the number of tickets allocated in column 614. Column 614 may represent the number of tickets allocated for match 12 without the dampening effect. In this example, the number of tickets allocated for each possibility may be dampened, or reduced, based on bad weather. The dampening percentage chosen may reflect the dampening effect based on historical data as to what is the typical reduction in attendance at the tournament based on similar external events. Dampening may also be done for certain matches in the absence of a common external event that affects a large number of player's ticket holders. This may occur if, for example, it is expected that a certain percentage of player's ticket holders will not attend a match even though they have a player's ticket referencing that match.

The benefits of predicting which players may be playing in particular matches may be applied beyond sales for seats in a stadium. For example, the "player's ticket" may apply equally to units of airtime for television advertisers. A company, which may endorse a particular athlete or player, may want to buy airtime for commercials when that athlete is playing in a match. This may provide a company with the opportunity to buy airtime to advertise the company's product endorsed by the athlete only when that athlete is playing in a match that is broadcast on television.

Although the invention has been described as it applies to tennis, this invention may be applied to any desirable sport and any desirable tournament playoff or scheduled matches or game. For example, in a sport such as baseball, a sports fan may purchase a team's ticket (i.e., what corresponds to a player's ticket for a team) for the playoff games. The team's ticket may be purchased before the season begins or during the season. For the playoffs, it may be unknown if a team may be involved in the playoffs and, if so, when and where the team may play their games in each round. The price of tickets may fluctuate based on the different times in the season tickets are purchased and for what round of the playoffs tickets are purchased.

Figure 11:
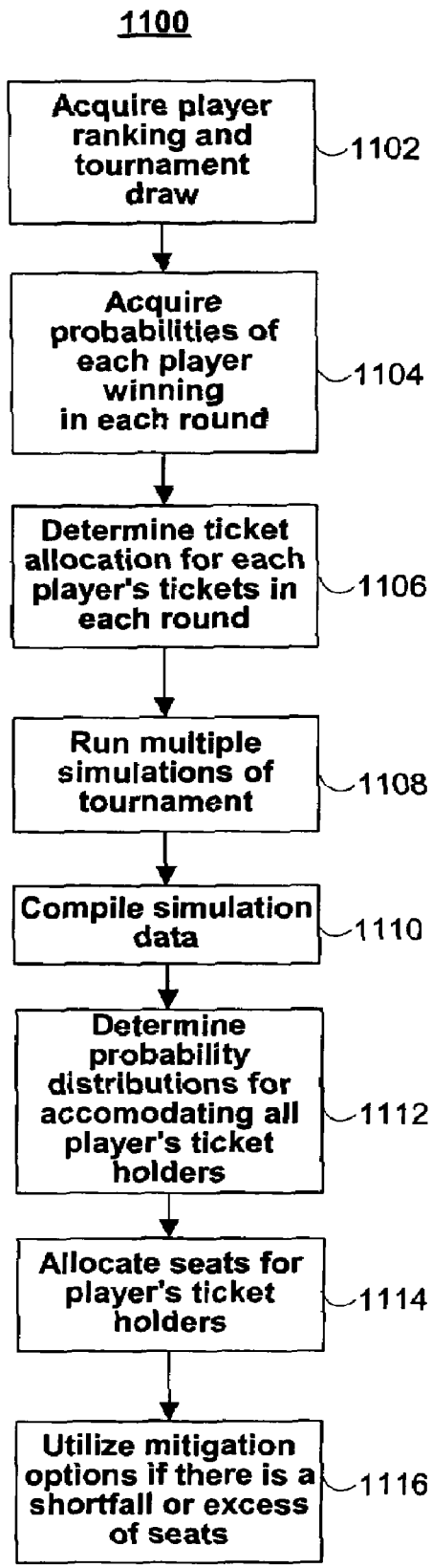
FIG. 11 is a flow diagram of a main process that may be used to provide player's tickets in accordance with certain embodiments of the present invention.

One embodiment of a player's ticketing process that may be used in accordance with the principles of the present invention is illustrated in process 1100 of FIG. 11. In practice, one or more steps shown may be combined with other steps, performed in any suitable order, performed in parallel—e.g., simultaneously or substantially simultaneously—or deleted. At step 1102, the player ranking and tournament draw may be acquired. The ranking and draw of the tournament may be performed in accordance with the techniques described in connection with FIG. 1. At step 1104, the probabilities of each player winning in each round may be acquired or determined. The probabilities may be determined in accordance with historical data as described in connection with FIG. 2. In addition, the probabilities may be recalculated as the tournament progresses as discussed in connection with FIGS. 2 and 8. Ticket allocations for each player's ticket sold in each round may be determined at step 1106. Player's ticket allocations in each round may be determined in accordance with the techniques described in connection with FIGS. 3 and 9.

At step 1108, multiple simulations of the tournament may be run in accordance with the simulation described in connection with FIGS. 4 and 5. After multiple simulations have been run, the simulation data may be compiled at step 1110. The simulation data may be compiled in accordance with the techniques described in connection with the FIGS. 6-8. Once the simulation data is compiled, the probability distributions for accommodating all player's ticket holders may be determined at step 1112. Seats may then be allocated for player's ticket holders in accordance with the techniques described in connection with FIGS. 6-8. Finally, mitigation options may be utilized, in accordance with the description provided above, if there is a shortfall or excess of seats, at step 1116.

One or more of steps 1108-1114 may be deleted and replaced with one or more steps of another technique to determine how seats may be allocated for player's ticket holders. Other techniques may be used other than running simulations to determine the probability with which each number of seats option may be required for each match in the tournament. For example, rather than running simulations, various formulas may be used to determine these values. The seat allocations for player's ticket holders may also be determined by various formulas.

A further embodiment of this invention may involve performing steps 1106-1114 in parallel—e.g., simultaneously or substantially simultaneously—in order to maximize expected profit for the entire tournament. This parallel performance of steps 1106-1114 may be done, for example, iteratively through a feedback loop. In this way, the results of step 1114 feedback to step 1106 and the entire procedure up to step 1114 is repeated until expected profit for the entire tournament is maximized. A system of equations solved in parallel may also be used to effectively perform steps 1106-1114. The impact of various mitigation options to be utilized in step 1116 may also be taken into account while attempting to maximize expected profit for the entire tournament in this embodiment. This may lead to those mitigation options, that are consistent with maximizing expected profit for the entire tournament, being utilized in step 1116.

A ticketing application may be provided to provide sports fans with player's tickets. It will be understood that the ticketing application may be any suitable, software, hardware, or both configured to implement the features of the present invention. The ticketing application may be located at a central location (e.g., a central server). In another suitable approach, the ticketing application may reside among different locations (e.g., a network).

In one particular embodiment, the ticketing application may include client-side software, hardware, or both. For example, the ticketing application may encompass one or more Web-pages or Web-page portions (e.g., via any suitable encoding, such as XML, ColdFusion, etc.).

Although the client-side ticketing application is described herein as being implemented on a workstation, this is only illustrative. The ticketing application may be implemented on any suitable platform (e.g., personal computer, palmtop computer, laptop computer, personal digital assistant, cellular phone, ticketing kiosk, etc.) to provide such features.

Referring to FIG. 12, an exemplary system 1200 for implementing the present invention is shown. As illustrated, system 1200 may include one or more ticketing workstations 1202. Workstations 1202 may be local or remote, and are connected by one or more communications links 1204 to a network 1206 that is linked via communications link 1208 to legacy server 1210 and communications link 1212 to player's ticketing server 1214. Servers 1210 and 1214 are connected by communications link 1216 to each other.

In system 1200, servers 1210 and 1214 may be any suitable server, processor, computer, or data processing device, or combination of the same. Computer network 1206 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1204, 1208, 1212, and 1216 may be any communications link suitable for communicating data between workstations 1202, legacy server 1210, and player's ticketing server 1214, such as network links, dial-up links, wireless links, hard-wired links, etc. Workstations 1202 enable a sports fan to purchase tickets. Workstations 1202 may be personal computers, laptop computers, mainframe computers, dumb terminals, data displays, Internet browsers, personal digital assistants (PDAs), two-way pagers, wireless terminals, portable telephones, ticketing kiosks, wireless phones, etc., or any combination of the same.

The servers and one of the workstations depicted in FIG. 12 are illustrated in more detail in FIG. 13. Referring to FIG. 13, workstation 1202 may include processor 1302, display 1304, input device 1306, printer 1307, and memory 1308, which may be interconnected. In a preferred embodiment, memory 1308 contains storage device 1309 for storing a workstation program for controlling processor 1302. Memory 1308 also preferably contains ticketing application 1310 according to the invention.

Processor 1302 uses the workstation program to present on display 1304 the ticketing application relating to ticketing received through the communications link 1204. Furthermore, input device 1306 may be used to manually enter commands and numbers in order for these commands and numbers to be communicated to the ticketing application. Printer 1307 may be any hardware that prints information provided from workstation 1202 onto paper. Printer 1307 may be used to print tickets (i.e., player's tickets, ordinary tickets, or any other type of ticket) for the sports fan (i.e., ticket holder).

Legacy server 1210 may include processor 1320, display 1322, input device 1324, and memory 1326, which may be interconnected. In a preferred embodiment, memory 1326 contains storage device 1328 for storing information relating to ticketing received through communications link 1208 or through other links. Storage device 1328 further contains a server program for controlling processor 1320. Memory also preferably contains ticketing application 1330 according to the invention. Processor 1320 uses the server program and ticketing application 1330 to transact the sale and issuance of tickets and to perform the above-mentioned systems and methods.

Player's ticketing server 1214 may include processor 1332, display 1334, input device 1336, memory 1338, historical-data database 1340, and admissions accommodation database 1342, which may be interconnected. Historical-data database 1340 may contain data gathered from previous tournaments and matches. As described above, this historical data may provide statistical data to aid in determining the possible winners of a tournament. The historical data may be gathered from any desirable source, such as, but not limited to, the Internet, an internally populated database, an externally populated database, and/or any other desirable source. In a preferred embodiment, memory 1338 contains storage device 1344 for storing a server program for controlling processor 1332. Memory 1338 also preferably contains player's ticketing application 1346 according to the invention. Processor 1332 may use the server program and player's ticketing application 1346 to determine the possible winners of the tournament by computer simulations or using various formulas as described above. Processor 1332 may also use the server program and player's ticketing application 1346 to determine the type and number of various player's tickets to be issued and the number of seats that may be allocated for each match to accommodate all player's ticket holders. The results of these determinations may be loaded into admissions accommodation database 1342. If computer simulations are used to make some or all of these determinations, then the results of the computer simulations may also be loaded into admissions accommodation database 1342 to facilitate ad-hoc querying of the simulation results as deemed necessary.

In the preferred embodiment, as illustrated in FIGS. 12 and 13, legacy server 1210 and player's ticketing server 1214 are provided as separate servers. Legacy server 1210 may provide the ticketing application without the player's ticketing capabilities, but may be customizable to include the player's ticketing capabilities. In one approach, legacy server 1210 may be designed such that it is scalable and can easily be customized to include additional applications, such as the player's ticketing application. In another approach, legacy server 1210 may be designed such that it may require major modifications to include the player's ticketing application. Legacy server 1210 may be customized to include the player's ticketing application by connecting it to player's ticketing server 1214 (which has player's ticketing application 1346) through communications link 1216. Legacy server 1210 may also be customized to include the player's ticketing application by incorporating the required features of player's ticketing server 1214 into legacy server 1210. In addition, player's ticketing server 1214 may be designed as a stand-alone ticketing system in that it includes all the required ticketing features of legacy server 1210.

Figure 14:
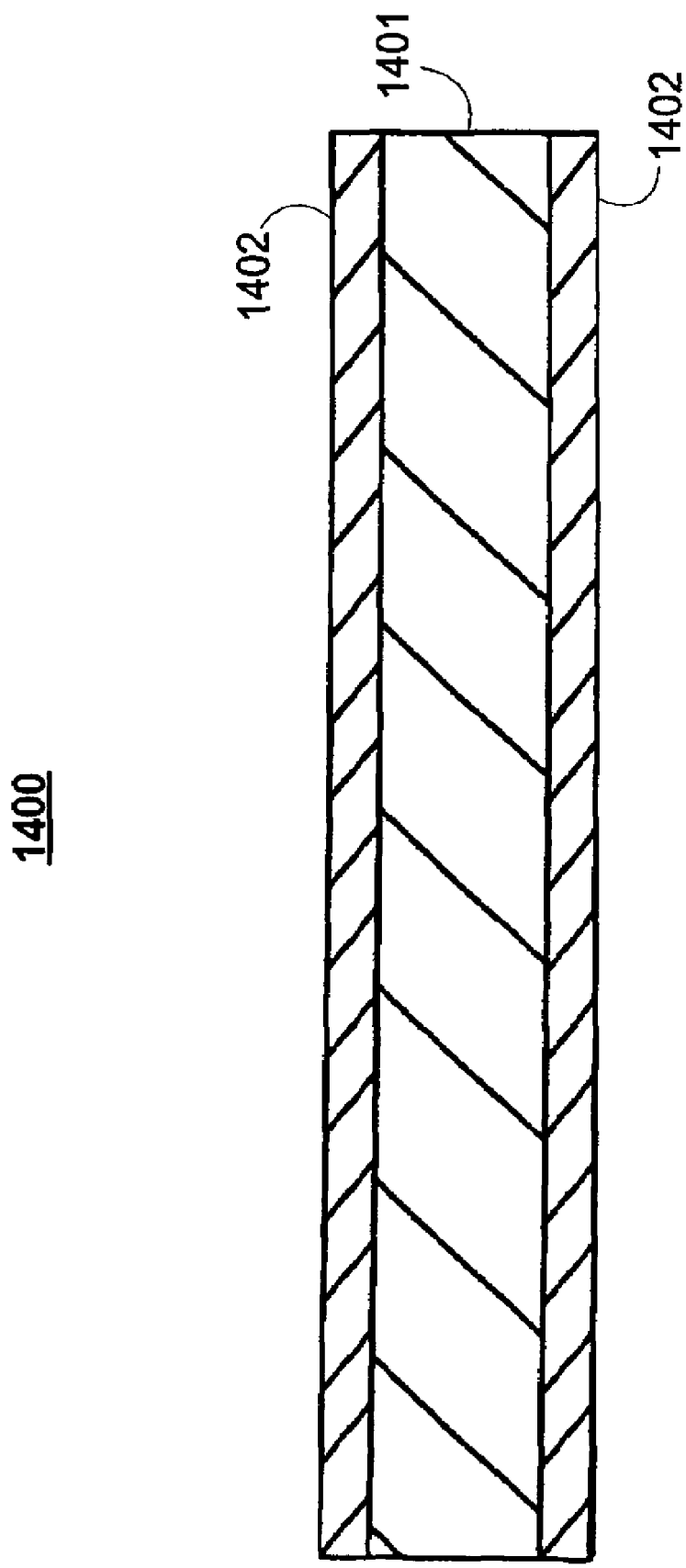
FIG. 14 is a cross-sectional view of a magnetic data storage medium encoded with a set of machine-executable instructions for performing the method according to the present invention.

FIG. 14 presents a cross-section of a magnetic data storage medium 1400 which can be encoded with a machine executable program that can be carried out by equipment such as workstation 1202, legacy server 1210, and/or player's ticketing server 1214 of FIGS. 12 and 13 to implement methods discussed in connection with FIGS. 1-13. Medium 1400 may be a storage device of workstation 1202, legacy server 1210, and/or player's ticketing server 1214 of FIGS. 12 and 13. Medium 1400 can be a floppy diskette or hard disk, having a suitable substrate 1401, which may be conventional, and a suitable coating 1402, which may be conventional, on one or both sides, containing magnetic domains (not visible) whose polarity or orientation can be altered magnetically. Medium 1400 may also have an opening (not shown) for receiving the spindle of a disk drive or other data device used to access the data stored on medium 1400.

The magnetic domains of coating 1402 of medium 1400 are polarized or oriented so as to encode, in manner which may be conventional, a machine-executable program such as those described above in connection with FIGS. 1-13, for execution by equipment such as workstation 1202, legacy server 1210, and/or player's ticketing server 1214 of FIGS. 12 and 13.

Figure 15:
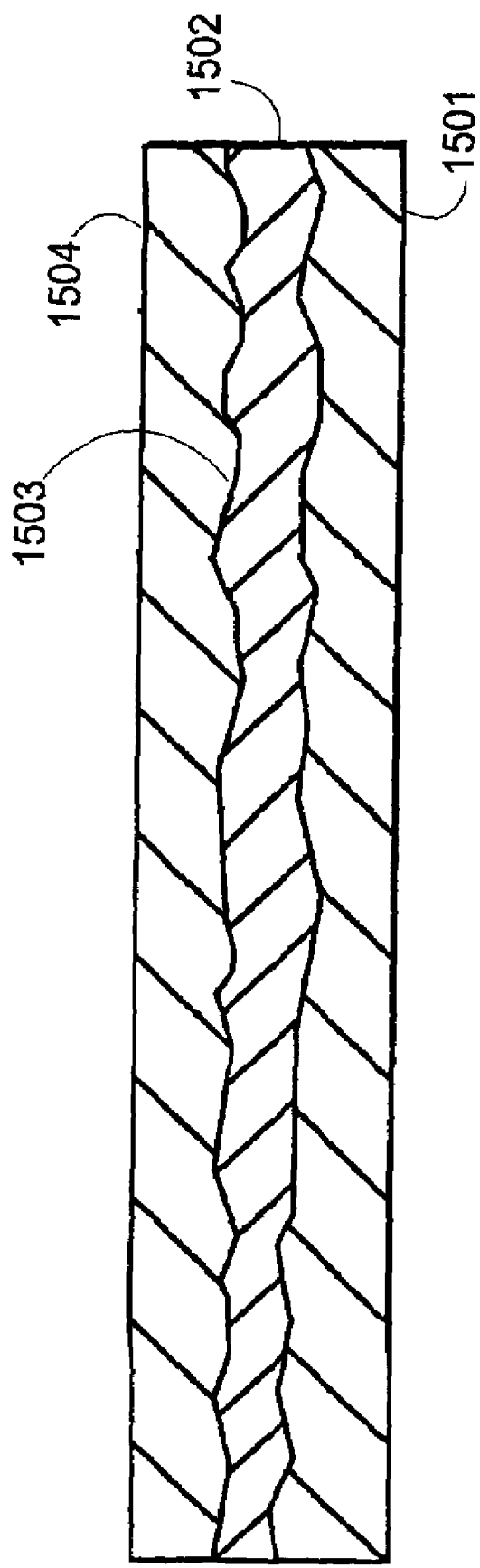
FIG. 15 is a cross-sectional view of an optically readable data storage medium encoded with a set of machine-executable instructions for performing the method according to the present invention.

FIG. 15 shows a cross-section of an optically-readable data storage medium 1500 which also can be encoded with such a machine-executable program, which can be carried out by equipment such as workstation 1202, legacy server 1210, and/or player's ticketing server 1214 of FIGS. 12 and 13. Medium 1500 can be a conventional compact disk read only memory (CD-ROM) or digital video disk read only memory (DVD-ROM) or a rewritable medium such as a CD-R or CD-RW, DVD-R, DVD-RW or DVD-RAM or a magneto-optical disk which is optically readable and magneto-optically rewritable. Medium 1500 preferably has a suitable substrate 1501, which may be conventional, and a suitable coating 1502, which may be conventional, usually on one or both sides of substrate 1501.

In the case of a CD-based or DVD-based medium, as is well-known, coating 1502 is reflective and is impressed with a plurality of pits 1503, arranged on one or more layers, to encode the machine-executable program. The arrangement of pits is read by reflecting laser light off the surface of coating 1502. A protective coating 1504, which preferably is substantially transparent, is provided on top of coating 1502.

In the case of a magneto-optical disk, as is well-known, coating 1502 has no pits 1503, but has a plurality of magnetic domains whose polarity or orientation can be changed magnetically when heated above a certain temperature, as by a laser (not shown). The orientation of the domains can be read by measuring the polarization of laser light reflected from coating 1502. The arrangement of the domains encodes the program as described above.

Thus, systems and methods for providing a player's ticket based on the probabilities of players winning their matches and the number and type of player's tickets sold for each player for each match have been described. Persons skilled in the art will appreciate that the present invention can be practiced by other than the described embodiments, which are presented for purposes of illustration and not of limitation, and that the present invention is limited only by the claims which follow.

What is claimed is:

1. A method configured to provide player's tickets, the method comprising:

receiving, using a player's ticketing server, a request for a player's ticket, wherein the received request comprises an indication of at least one player and an indication of at least one tournament in which the at least one player is playing;

in response to receiving the request, providing, using the player's ticketing server, a player's ticket that permits entry to at least one match of the at least one tournament in which the at least one player is playing; and in response to providing the player's ticket, allocating event admissions for the player's ticket for the at least one match of the at least one tournament, wherein allocating event admissions for the player's ticket comprises: determining probability distributions configured to accommodate all player's ticket holders, and determining a profitability of all player's tickets, wherein determining the profitability comprises maximizing a total profit based on total revenue less total cost; and determining a price for the provided player's ticket, the price based at least in part on the profitability of all of the player's tickets.

2. The method of claim 1 wherein the request comprises a round indication and the player's ticket permits entry only to matches of the at least one tournament in which the at least one player is playing that are associated with the round indication.

3. The method of claim 1 wherein receiving the request comprises receiving the request in advance of the start of the at least one match of the at least one tournament.

4. The method of claim 1 further comprising allocating event admissions for player's tickets for the at least one match of the at least one tournament, wherein allocating event admissions for player's tickets comprises determining the probability of the at least one player winning at least one match of the at least one tournament.

5. The method of claim 1 further comprising determining a price for the provided player's ticket, wherein determining a price for the provided player's ticket comprises determining, based at least in part on historical data, the number of matches the at least one player is expected or projected to play in the at least one tournament.

6. The method of claim 1 further comprising:

determining if there exists a shortfall or an excess of seats for player's tickets for a particular match of the more than one match; and in response to determining that there exists a shortfall or an excess of seats, implementing a mitigation technique to manage the shortfall or the excess of seats, wherein the mitigation technique is selected from the group consisting of: selling the excess of seats as ordinary tickets, repackaging the excess of seats as part of new player's tickets, re-allocating unsold tickets for player's tickets, and buying back unsold ordinary tickets and reallocating the unsold ordinary tickets as player's tickets.

7. The method of claim 1 further comprising:

determining if there exists a shortfall of seats for player's tickets for a particular match; and in response to determining that there exists a shortfall of seats, implementing a mitigation technique to compensate for the shortfall of seats, wherein the mitigation technique is selected from the group comprising: buying back an ordinary ticket seat, buying back a player's ticket seat, exchanging the player's ticket for a voucher, providing a credit to the player's ticket holder, providing a ticket option for another match.

8. A system configured to provide player's tickets and determining event admissions for player's tickets, the system comprising a server at which a ticketing application has been implemented to configure the server to:

receive a request for a player's ticket, wherein the received request comprises an indication of at least one player and an indication of at least one tournament in which the at least one player is playing;

in response to receiving the request, provide a player's ticket that permits entry to at least one match of the at least one tournament in which the at least one player is playing; and in response to providing the player's ticket, allocate event admissions for the player's ticket for the at least one match of the at least one tournament, wherein allocating event admissions for the player's ticket comprises: determining probability distributions configured to accommodate all player's ticket holders, and determining a profitability of all player's tickets, wherein determining the profitability comprises maximizing a total profit based on total revenue less total cost; and determine a price for the provided player's ticket, the price based at least in part on the profitability of all of the player's tickets.

9. The system of claim 8 wherein the request comprises a round indication and the player's ticket permits entry only to matches of the at least one tournament in which the at least one player is playing that are associated with the round indication.

10. The system of claim 8 wherein receiving the request comprises receiving the request in advance of the start of the at least one match of the at least one tournament.

11. The system of claim 8 wherein the ticketing application is further configured to allocate event admissions for player's tickets for the at least one match of the at least one tournament by determining the probability of the at least one player winning at least one match of the at least one tournament.

12. The system of claim 8 wherein the ticketing application is further configured to determine a price for the provided player's ticket based at least in part on historical data, the number of matches the at least one player is expected or projected to play in the at least one tournament.

13. The system of claim 8 wherein the ticketing application is further configured to:

determine if there exists a shortfall or an excess of seats for player's tickets for a particular match of the more than one match; and in response to determining that there exists a shortfall or an excess of seats, implement a mitigation technique to manage the shortfall or the excess of seats, wherein the mitigation technique is selected from the group consisting of: selling the excess of seats as ordinary tickets, repackaging the excess of seats as part of new player's tickets, re-allocating unsold tickets for player's tickets, and buying back unsold ordinary tickets and reallocating the unsold ordinary tickets as player's tickets.

14. The system of claim 8 wherein the ticketing application is further configured to:

determine if there exists a shortfall of seats for player's tickets for a particular match; and in response to determining that there exists a shortfall of seats, implementing a mitigation technique to compensate for the shortfall of seats, wherein the mitigation technique is selected from the group comprising: buying back an ordinary ticket seat, buying back a player's ticket seat, exchanging the player's ticket for a voucher, providing a credit to the player's ticket holder, providing a ticket option for another match.

* * * * *

UNITED STATES PATENT AND TRADEMARK OFFICE
CERTIFICATE OF CORRECTION

PATENT NO. : 7,850,523 B2
APPLICATION NO. : 12/644773
DATED : December 14, 2010
INVENTOR(S) : Sharad A. Ghosh It is certified that error appears in the above-identified patent and that said Letters Patent is hereby corrected as shown below:

Title Page;
Bibliographic Data

(76) change "6A Cameron Tower, Essena East Forbes Condominium, Fort Vonifacio, Taguig (PH)" to -- 6A Cameron Tower, Essensa East Forbes Condominium, Fort Bonifacio, Taguig City 1634, Philippines --

Signed and Sealed this
Seventeenth Day of April, 2012

David J. Kappos
*Director of the United States Patent and Trademark Office*